(12) United States Patent
Ward et al.

(10) Patent No.: US 6,278,861 B1
(45) Date of Patent: Aug. 21, 2001

(54) MOBILE EARTH TERMINAL WITH ROAMING CAPABILITY

(75) Inventors: Michael K. Ward, North Potomac, MD (US); Gary G. Churan, Reston; William R. Tisdale, Purcellville, both of VA (US); David J. Ross, Encinatas, CA (US)

(73) Assignee: Motient Services Inc., Reston, VA (US)

( * ) Notice: Subject to any disclaimer, the term of this patent is extended or adjusted under 35 U.S.C. 154(b) by 0 days.

(21) Appl. No.: 09/124,254

(22) Filed: Jul. 29, 1998

Related U.S. Application Data

(63) Continuation-in-part of application No. 08/634,305, filed on Apr. 16, 1996, now Pat. No. 5,815,809.
(60) Provisional application No. 60/008,374, filed on Aug. 15, 1995.

(51) Int. Cl.$^7$ .................................................. H04B 7/185
(52) U.S. Cl. ...................... 455/13.1; 455/430; 455/552; 455/557
(58) Field of Search .................................. 455/467, 428, 455/430, 12.1, 426, 550, 552, 553, 557, 13.1

(56) References Cited

U.S. PATENT DOCUMENTS

| | | |
|---|---|---|
| 5,043,736 | 8/1991 | Darnell et al. . |
| 5,119,504 | 6/1992 | Durboraw, III . |
| 5,129,095 | 7/1992 | Davis et al. . |
| 5,161,248 | 11/1992 | Bertiger et al. . |
| 5,187,805 | 2/1993 | Bertiger et al. . |
| 5,235,633 | 8/1993 | Dennison et al. . |
| 5,268,694 | 12/1993 | Jan et al. . |
| 5,274,840 | 12/1993 | Schwendeman . |
| 5,297,183 | 3/1994 | Bareis et al. . |
| 5,303,286 | 4/1994 | Wiedeman . |
| 5,327,572 | 7/1994 | Freeburg ............................ 455/13.1 |
| 5,343,512 | 8/1994 | Wang et al. . |
| 5,365,450 | 11/1994 | Schuchman et al. . |
| 5,367,304 | 11/1994 | Jan et al. . |
| 5,389,934 | 2/1995 | Kass . |
| 5,394,561 | 2/1995 | Freeburg . |
| 5,526,404 | 6/1996 | Wiederman et al. . |
| 5,535,430 | * 7/1996 | Aoki et al. .......................... 455/12.1 |
| 5,621,415 | 4/1997 | Tuck . |

OTHER PUBLICATIONS

"North American Mobile Satellite System Signaling Architecture", by L. White et al., American Institute of Aeronautics and Astronautics, Inc., pp. 427–439.

(List continued on next page.)

*Primary Examiner*—Edward F. Urban
(74) *Attorney, Agent, or Firm*—Irah H. Donner; Anthony H. Kahng; Hale and Dorr LLP

(57) ABSTRACT

In a mobile satellite system, a mobile communication system includes a user interface system, an antenna system, a transceiver system, a logic and signaling system. The logic and signaling system provides a communication function permitting the mobile communication system to roam between the mobile satellite system and a terrestrial based communication system responsive to the user selection of a primary service and an alternate service. The mobile communication system also includes a digital terminal equipment unit initiating setup and release for a data call, and a facsimile interface unit initiating setup and release for a facsimile call. The facsimile interface unit generates a line control packet responsive to a line state transition indicating transmission of information associated with a new line state over a communication channel. The facsimile interface unit includes a look ahead buffer to perform early line control packet detection by looking ahead a predetermined time interval into a received satellite data stream and identifying a valid idle line control packet.

8 Claims, 29 Drawing Sheets

OTHER PUBLICATIONS

"The AMSC/TMI Mobile Satellite Services (MSS) System Ground Segment Architecture", by J. Lunsford et al., American Institute of aeronautics and Astronautics, Inc., pp. 405–426.

"Call Control in the AMSC Mobile Satellite Service System", by W. R.H. Tisdale et al., Pre–Publication Review Copy, American Institute of Aeronautics and Astronautics, Mar. 1, 1994, pp. 1–13.

"Westinghouse MSAT Mobile Terminal Channel Emulator", by A. Fasulo et al., American Institute of Aeronautics and Astronautics, pp. 256–260.

"MSAT Network Communications Controller and Network Operations Center", by T. Harvey et al., American Institute of Aeronautics and Astronautics, pp. 270–279.

"Fedderlink Earth Station to Provide Mobile Satellite Services in North America", Robert H. McCauley et al., American Institute of Aeronautics and Astronautics, Jan./Feb. 1994, pp. 1–9.

"Radio Transmission in the American Mobile Satellit System", Charles Kittiver, American Institute of Aeronautics and Astronautics, Inc., pp. 280–294.

"Summary of the AMSC Mobile Telephone System", Gary A. Johanson et al., American Institute of Aeronautics and Astronautics, Inc., pp. 1–11.

"Implementation of a System to Provide Mobile Satellite Services in North America", Gary A. Johanson et al., presented at International Mobile Satellite Conference '93, Jun. 16–18, 1993.

"The American Mobile Satellite Corporation Space Segment", David J. Whalen et al., pp. 394–404.

"Mobile Earth Terminals In the AMSC Mobile Satellite Service System", Kok–Song et al., American Institute of Aeronautics and Astronatuics, (1994), pp. 1–11.

* cited by examiner

| PARAMETER | REQUIREMENT |
|---|---|
| L-BAND AEIRP | 56.6 dBW AT NOISE POWER RATIO OF 18 dB |
| Ku-BAND AEIRP | 36.7 dBW |
| L-BAND RECEIVE G/T | +2.7 dB/°K |
| Ku-BAND RECEIVE G/T | -3.6 dB/°K |
| L-BAND FREQUENCIES | 1530 TO 1559 MHz (TRANSMIT)<br>1631.5 TO 1660.5 MHz (RECEIVE) |
| Ku-BAND FREQUENCIES | 10,750 - 10,950 MHz (CENTRAL SATELLITE TRANSMIT)<br>13,000 - 13,150 MHz &<br>13,200 - 13,250 MHz (CENTRAL SATELLITE RECEIVE)<br>11,700 - 11,900 MHz (WING SATELLITE TRANSMIT)<br>14,000 - 14,200 MHz (WING SATELLITE RECEIVE) |

FIG. 2

| MODES/FUNCTIONS | | |
|---|---|---|
| MODE | REGISTRATION | OPERATION |
| SATELLITE ONLY | POWER ON REGISTRATION IN MSS ONLY, IF AVAILABLE. SYSTEM MAY NOT RE-REGISTER IS PRIOR REGISTRATION WAS IN MSS. | MET USES MSS ONLY. IF SATELLITE COVERAGE IS UNAVAILABLE, SERVICE IS DISALLOWED. NO REQUIREMENT FOR HANDOFF. |
| AUTOMATIC ROAMING, SATELLITE PRIORITY | POWER ON REGISTRATION IN MSS, UNLESS UNAVAILABLE, IN WHICH CASE MET REGISTERS IN CMC SYSTEM. MOBILE WILL RETURN REGISTRATION TO MSS WHENEVER POSSIBLE. | MET USES MSS IF AVAILABLE. CELLULAR COMMUNICATION IS USED AS LAST RESORT. LIVE CALL HANDOFF FROM SERVING CMC IS TO ADJACENT CMC IF POSSIBLE, OTHERWISE TO MSS. HANDOFF FROM MSS TO CELLULAR IS NOT SUPPORTED. |
| AUTOMATIC ROAMING, CELLULAR PRIORITY | POWER ON REGISTRATION IN CMC SYSTEM, EITHER HOMED OR AS VISITOR. IF CELLULAR COVERAGE IS UNAVAILABLE., MET WILL REGISTER IN MSS. MET WILL RETURN REGISTRATION TO CMC WHENEVER POSSIBLE. | MET USES CELLULAR CARRIER IF AVAILABLE. SATELLITE COMMUNICATION IS USED AS LAST RESORT. LIVE CALL HANDOFF FROM SERVING CMC IS TO ADJACENT CMC IS POSSIBLE, OTHERWISE TO MSS. HANDOFF FROM MSS TO CELLULAR IS NOT SUPPORTED |
| AUTOMATIC ROAMING, CELLULAR PRIORITY, HOME CMC ONLY | POWER ON REGISTRATION IN CMC SYSTEM, IF AVAILABLE. IF HOME CELLULAR COVERAGE IS UNAVAILABLE, MET WILL REGISTER AS A ROAMER IN MSS. MET WILL RETURN REGISTRATION TO HOME CMC WHENEVER POSSIBLE. | MET USES HOME CELLULAR CARRIER IF AVAILABLE, AND ROAMS ONLY TO MSS. LIVE CALL HANDOFF FROM SERVING CMC IS TO ADJACENT CMC IF POSSIBLE, OTHERWISE TO MSS. HANDOFF FROM MSS TO CELLULAR IS NOT SUPPORTED. |
| CELLULAR ONLY | POWER ON REGISTRATION IN HOME CMC IF AVAILABLE, OR AS ROAMER IN VISITED CMC. REGISTRATION FOLLOWS NORMAL CELLULAR PROCEDURES. REGISTRATION AS ROAMER IN MSS IS DISALLOWED. | MET USES HOME CELLULAR CARRIER IF AVAILABLE, AND ROAMS ONLY TO OTHER CMCs. LIVE CALL HANDOFF FROM SERVING CMC IS TO ADJACENT CMC IF POSSIBLE. HANDOFF TO MSS IS DISALLOWED. |

FIG. 19

MOBILE EARTH TERMINAL WITH ROAMING CAPABILITY

RELATED APPLICATIONS

This application is a continuation-in-part and claims priority to U.S. Application No. 08/634,305, filed on Apr. 16, 1996, now U.S. Pat. No. 5,815,809, which in turn claims priority to U.S. Provisional Application No/ 60/008,374 filed Aug. 15, 1995, all incorporated herein by reference.

TECHNICAL FIELD

The present invention relates generally to an improved mobile earth terminal (MET) communication device for satellite communication, and more particularly, to an improved mobile earth terminal communication device for satellite communication providing voice, data, and facsimile transmission between mobile earth terminals and feederlink earth stations (FESs) that act as gateways to public networks or base stations associated with private networks.

BACKGROUND ART

An overview of the satellite network system is illustrated in FIG. 1. The satellite network system design provides the capability for METs and FESs to access one or more multiple beam satellites located in geostationary orbit to obtain communications services.

The heart of the satellite network system for each of the networks is the Network Control System (NCS) which monitors and controls each of the networks. The principal function of the NCS is to manage the overall satellite network system, to manage access to the satellite network system, to assign satellite circuits to meet the requirements of mobile customers and to provide network management and network administrative and call accounting functions.

The satellites each transmit and receive signals to and from METs at L-band frequencies and to and from Network Communications Controllers (NCCs) and Feederlink Earth Stations (FESs) at Ku-band frequencies. Communications at L-band frequencies is via a number of satellite beams which together cover the service area. The satellite beams are sufficiently strong to permit voice and data communications using inexpensive mobile terminals and will provide for frequency reuse of the L-band spectrum through inter-beam isolation.

The satellite network system provides the capability for mobile earth terminals to access one or more multiple beam satellites located in geostationary orbit for the purposes of providing mobile communications services. The satellite network system is desired to provide the following general categories of service:

Mobile Telephone Service (MTS). This service provides point-to-point circuit switched voice connections between mobile and public switched telephone network (PSTN) subscriber stations. It is possible for calls to be originated by either the mobile terminal or terrestrial user. Mobile terminal-to-mobile terminal calls are also supported.

Mobile Radio Service (MRS). This service provides point-to-point circuit switched connections between mobile terminal subscriber stations and subscriber stations in a private network (PN) which is not a part of the PSTN. It is possible for calls to be originated from either end. Mobile terminal-to-mobile terminal calls are also supported.

Mobile Telephone Cellular Roaming Service (MTCRS). This service provides Mobile Telephone Service to mobile subscribers who are also equipped with cellular radio telephones. Then the mobile terminal is within range of the cellular system, calls are serviced by the cellular system. When the mobile terminal is not in range of the cellular system, the MTCRS is selected to handle the call and appears to the user to be a part of the cellular system. When the mobile terminal is not in range of the cellular system, the MTCRS is selected to handle the call and appears to the user to be a part of the cellular system. It is possible for calls to be originated either from the MET or the PSTN. Mobile terminal-to-mobile terminal calls are also supported.

NET Radio (NR). This service provides point-to-multipoint circuit switched connections between mobile terminal subscriber stations and a central base station. Mobile users are able to listen to two-way conversations and to transmit using a push-to-talk mode of operation.

Mobile Data Service (MDS). This service provides a packet switched connection between a data terminal equipment (DTE) device at a mobile terminal and a data communications equipment (DCE)/DTE device connected to a public switched packet network. Integrated voice/data operation is also supported.

The satellites are designed to transmit signals at L-band frequencies in the frequency band 1530–1559 MHz. They will receive L-band frequencies in the frequency band 1631.5–1660.5 MHz. Polarization is right hand circular in both bands. The satellites will also transmit in the Ku frequency band, 10,750 MHz to 10,950 MHz, and receive Ku-band signals in the frequency band 13,000 to 13,250 MHz.

The satellite transponders are designed to translate communications signals accessing the satellite at Ku-band frequencies to an L-band frequency in a given beam and vice versa. The translation will be such that there is a one-to-one relation between frequency spectrum at Ku-band and frequency spectrum in any beam at L-band. The satellite transponders will be capable of supporting L-band communications in any portion of the 29 MHz allocation in any beam.

Transponder capacity is also provided for Ku-band uplink to Ku-band down-link for signalling and network management purposes between FESs and NCCs. The aggregate effective isotropic radiated power (AEIRP) is defined as that satellite e.i.r.p. that would result if the total available communications power of the communications subsystem was applied to the beam that covers that part of the service area. Some of the key performance parameters of the satellite are listed in FIG. 2.

The satellite network system interfaces to a number of entities which are required to access it for various purposes. FIG. 3 is a context diagram of the satellite network system illustrating these entities and their respective interfaces. Three major classes of entities are defined as user of communications services, external organizations requiring coordination, and network management system.

The users of satellite network communications services are MET users who access the satellite network system either via terrestrial networks (PSTN, PSDN, or Private Networks) or via METs for the purpose of using the services provided by the system. FES Owner/Operators are those organizations which own and control FESs that provide a terrestrial interface to the satellite network. When an FES becomes a part of the satellite network, it must meet specified technical performance criteria and interact with and accept real-time control from the NCCs. FES Owner/Operators determine the customized services that are offered and are ultimately responsible for the operation and maintenance of the FES. Customers and service providers interact with the Customer Management Information System within the Network Management System.

The satellite network system interfaces to, and performs transactions with, the external organizations described below:

Satellite Operations Center (SOC):

The SOC is not included in the satellite network ground segment design. However, the satellite network system interfaces with the SOC in order to maintain cognizance of the availability of satellite resources (e.g. in the event of satellite health problems, eclipse operations, etc.) and, from time to time, to arrange for any necessary satellite reconfiguration to meet changes in traffic requirements.

NOC:

The satellite network system interfaces with the satellites located therein via the NOC for a variety of operational reasons including message delivery and coordination.

Independent NOCS:

The satellite network system interfaces with outside organizations which lease resources on satellite network satellites and which are responsible for managing and allocating these resources in a manner suited to their own needs.

Other System NOCs:

This external entity represents outside organizations which do not lease resources on satellite network satellites but with whom operational coordination is required.

The satellite network management system (NMS) is normally located at an administration's headquarters and may comprise three major functional entities; Customer Management Information System (CMIS), Network Engineering, and System Engineering (NE/SE). These entities perform functions necessary for the management and maintenance of the satellite network system which are closely tied to the way the administration intends to do business. The basic functions which are performed by CMIS, Network Engineering, and System Engineering are as follows:

Customer Management Information System:

This entity provides customers and service providers with assistance and information including problem resolution, service changes, and billing/usage data. Customers include individual MET owners and fleet managers of larger corporate customers. Service providers are the retailers and maintenance organizations which interact face to face with individual and corporate customers.

Network Engineering:

This entity develops plans and performs analysis in support of the system. Network Engineering analyzes the requirements of the network. It reconciles expected traffic loads with the capability and availability of space and ground resources to produce frequency plans for the different beams within the system. In addition, Network Engineering defines contingency plans for failure situations.

System Engineering:

This entity engineers the subsystems, equipment and software which is needed to expand capacity to meet increases in traffic demands and to provide new features and services which become marketable to subscribers.

The satellite network system comprises a number of system elements and their interconnecting communications links as illustrated in FIG. 4. The system elements are the NOC, the NCC, the FES, the MET, the Remote Monitor Station (RMS), and the System Test Station (STS). The interconnecting communications links are the satellite network Internetwork, terrestrial links, the MET signaling channels, the Interstation signaling channels, and the MET-FES communications channels. The major functions of each of the system elements are as follows:

NOC.

The NOC manages and controls the resources of the satellite network system and carries out the administrative functions associated with the management of the total satellite network system. The NOC communicates with the various internal and external entities via a local area network (LAN) /wide area network (WAN) based satellite network Internetwork and dial-up lines.

NCC.

The NCC manages the real time allocation of circuits between METs and FESs for the purposes of supporting communications. The available circuits are held in circuit pools managed by Group Controllers (GCs) within the NCC. The NCC communicates with the NOC via the satellite network Internetwork, with FESs via Ku-to-Ku band interstation signaling channels or terrestrial links, and with mobile terminals via Ku-to-L band signaling channels.

FES.

The FES supports communications links between METS, the PSTN, private networks, and other MTs. Once a channel is established with an MT, call completion and service feature management is accomplished via In-Band signaling over the communication channel. Two types of FESs have been defined for the satellite network system; Gateway FESs and Base FESs. Gateway FESs provide MTS and MTCRS services. Base FESs provide MRS and NR services.

MET.

The MET provides the mobile user access to the communications channels and services provided by the satellite network system. A range of terminal types has been defined for the satellite network system.

RMS.

The RMS monitors L-band RF spectrum and transmission performance in specific L-band beams. An RMS is nominally located in each L-band beam. Each RMS interfaces with the NOC via either a satellite or terrestrial link.

STS.

The STS provides an L-band network access capability to support FES commissioning tests and network service diagnostic tests. The STS is collocated with, and interfaced to, the NOC.

Communications channels transport voice transmissions between METs and FESs via the satellite. Connectivity for MET-to-MET calls is accomplished by double hopping the communications channels via equipped FESs. Signaling channels are used to set up and tear down communications circuits, to monitor and control FES and MET operation, and to transport other necessary information between network elements for the operation of satellite network. The system provides Out-of-Band and Interstation signaling channels for establishing calls and transferring information. In-Band signaling is provided on established communications channels for supervisory and feature activation purposes. A detailed description of the satellite network signaling system architecture is provided in L. White, et al., "North American Mobile Satellite System Signaling Architecture," AIAA 14th International Communications Satellite Conference, Washington, DC (March 1992), incorporated herein by reference.

The satellite network Internetwork provides interconnection among the major satellite network ground system elements such as the NOCs, NCCs, and Data Hubs, as well as external entities. Various leased and dial-up lines are used for specific applications within the satellite network system such as backup interstation links between the NCC and FESs and interconnection of RMSs with the NOC.

The primary function of the NOC is to manage and control the resources of the satellite network system. FIG. 5 is a basic block diagram of the NOC and its interface. The NOC computer is shown with network connections, peripheral disks, fault tolerant features, and expansion capabilities to accommodate future growth. The NOC software is represented as two major layers, a functional layer and a support layer. The functional layer represents the application specific portion of the NOC software. The support layer represents software subsystems which provide a general class of services and are used by the subsystems in the functional layer.

The application specific functions performed by the NOC are organized according to five categories: fault management, accounting management, configuration management, performance management, and security management. The general NCC Terminal Equipment (NCCTE) configuration showing constituent equipment includes: processing equipment, communications equipment, mass storage equipment, man-machine interface equipment, and optional secure MT Access Security Key (ASK) storage equipment. The Processing Equipment consists of one or more digital processors that provide overall NCC control, NCS call processing, network access processing and inter-network communications processing.

The Communications Equipment consists of satellite signaling and communications channel units and FES terrestrial communication link interface units. The Mass Storage Equipment provides NCC network configuration database storage, call record spool buffering an executable program storage. The Man-Machine Interface Equipment provides operator command, display and hard copy facilities, and operator access to the computer operating systems. The MT ASK storage Equipment provides a physically secure facility for protecting and distributing MT Access Security Keys.

The NCCTE comprises three functional subsystems: NCCTE Common Equipment Subsystem, Group Controller Subsystem, and Network Access Subsystem. The NCCTE Common Equipment subsystem comprises an NCC Controller, NCCTE mass storage facilities, and the NCCTE man-machine interface. The NCC Controller consists of processing and database resources which perform functions which are common to multiple Group Controllers. These functions include satellite network Internetwork communications, central control and monitoring of the NCCTE and NCCRE, storage of the network configuration, buffering of FES and Group Controller call accounting data, transfer of transaction information to the Off-line NCC and control and monitoring of FESs.

The Mass Storage element provides NCC network configuration database storage, call accounting data spool buffering, and NCCTE executable program storage. The Man-machine Interface provides Operator command and display facilities for control and monitoring of NCC operation and includes hard copy facilities for logging events and alarms. A Group Controller (GC) is the physical NCC entity consisting of hardware and software processing resources that provides real time control according to the CG database received from the NOC.

The Group Controller Subsystem may incorporate one to four Group Controllers. Each Group Controller maintains state machines for every call in progress within the Control Group. It allocates and de-allocates circuits for FES-MET calls within each beam of the system, manages virtual network call processing, MET authentication, and provides certain elements of call accounting. When required, it provides satellite bandwidth resources to the NOC for AMS (R)S resource provisioning. The Group Controller monitors the performance of call processing and satellite circuit pool utilization. It also performs MET management, commissioning and periodic performance verification testing.

The Network Access Subsystem consists of satellite interface channel equipment for Out-of-Band signaling and Interstation Signaling which are used to respond to MET and FES requests for communications services. The Network Access Processor also includes MET communications interfaces that are used to perform MET commission testing. In addition, the subsystem includes terrestrial data link equipment for selected FES Interstation Signaling.

The principal function of the FES is to provide the required circuit switched connections between the satellite radio channels, which provide communications links to the mobile earth terminals, and either the PSTN or PN. FESs will be configured as Gateway Stations (GS) to provide MTS and MTCRS services or Base Stations to provide MRS and Net Radio services. Gateway and Base functions can be combined in a single station.

The FES operates under the real time control of the Network Communications Controller (NCC) to implement the call set-up and take-down procedures of the communications channels to and from the METs. Control of the FES by the NCC is provided via the interstation signaling channels. An FES will support multiple Control Groups and Virtual Networks. The FES is partitioned into two major functional blocks, the FES RF Equipment (FES-RE) and the FES Terminal Equipment (FES-TE). The principal function of the FES-RE is to provide the radio transmission functions for the FES. In the transmit direction it combines all signals from the communications and interstation signaling channel unit outputs from the FES-TE, and amplifies them and up-convert these to Ku-Band for transmission to the satellite via the antenna. In the receive direction, signals received from the satellite are down-converted from Ku-Band, amplified and distributed to the channel units within the FES-TE. Additional functions include satellite induced Doppler correction, satellite tracking and uplink power control to combat rain fades.

The principal function of the FES-TE is to perform the basic call processing functions for the FES and to connect the METs to the appropriate PSTN or PN port. Under control of the NCC, the FES assigns communications channel units to handle calls initiated by MET or PSTN subscribers. The FES-TE also performs alarm reporting, call detail record recording, and provision of operator interfaces.

For operational convenience, an FES may in some cases be collocated with the NCC. In this event, the NCC RF Equipment will be shared by the two system elements and the interstation signaling may be via a LAN. Connection to and from the PSTN is via standard North American interconnect types as negotiated with the organization providing PSTN interconnection. This will typically be a primary rate digital interconnect. Connection to and from private networks is via standard North American interconnect types as negotiated with the organization requesting satellite network service. This will typically be a primary rate digital interconnect for larger FESs or an analog interconnect for FESs equipped with only a limited number of channels may be employed.

There is a general need for an integrated mobile telephone that can be used to transmit to, and receive from, a satellite. In this connection, however, we have discovered that an integrated mobile communication device is needed that provides the ability to roam between a satellite network and a terrestrial based network. Further, we have discovered that the mobile communication device should include the ability to transmit and receive data and facsimile communications. In this connection, we have discovered that there are certain communication delays between the mobile communication device and the satellite that adversely affect the ability to accomplish the above functions. Accordingly, we have discovered that such delays require compensation to effectively and efficiently effectuate transmissions between the mobile communication device and the satellite network.

SUMMARY OF THE INVENTION

It is a feature and advantage of the present invention to provide an integrated mobile communication device that provides the ability to roam between a satellite network and a terrestrial based network.

It is another feature and advantage of the present invention to provide a mobile communication device that includes the ability to transmit and receive data and facsimile communications.

It is another feature and advantage of the present invention to compensate for certain communication delays between the mobile communication device and the satellite that adversely affect the ability to accomplish the above functions.

It is another feature and advantage of the present invention to generally effectively and efficiently effectuate transmissions between the mobile communication device and the satellite network by utilizing an efficient communication protocol.

The present invention is based, in part, on the identification of the problem of the communication delays that have jeopardized the reliability of communication between the satellite and the mobile communication device. Further, the present invention is also based, in part, on identification of the problem associated with failed attempts to register on the different communication networks. In accordance with the features of the present invention, controls are introduced to minimize the loss of communication due to delays in the satellite network, including the utilization of an effective communication protocol to accomplish same. In addition, the present invention includes additional techniques for more efficiently registering and reregistering on or between the satellite and terrestrial networks.

To achieve these and other features and advantages of the present invention, a mobile communication system is provided in a mobile satellite system. The mobile satellite system includes a satellite communication switching office having a satellite antenna for receiving/transmitting a satellite message via a satellite from/to a vehicle using a mobile communication system, a satellite interface system, a central controller receiving/transmitting the satellite message from/ to the satellite communication switching office issued from the vehicle via the satellite and the satellite interface system. The mobile communication system includes a user interface system providing a user interface through which a user has access to services supported by the mobile satellite system, and an antenna system providing an interface between the mobile communication system and the mobile satellite system via the satellite interface system, and receiving a first satellite message from the satellite and transmitting a second satellite message to the satellite. The antenna system includes an antenna including one of a directional and an omnidirectional configuration, a diplexer, a low noise amplifier, a beam steering unit when the antenna is of the directional configuration, and at least one of a compass and sensor to determine vehicle orientation. The mobile communication system also includes a transceiver system, operatively connected to the antenna system, including a receiver and a transmitter. The transmitter converts the second satellite message including at least one of voice, data, fax and signaling signals into a modulated signal, and transmits the modulated signal to the antenna system. The transmitter includes an amplifier, a first converter and associated first frequency synthesizer, a modulator, an encoder, diplexer, scrambler and frame formatter for at least one of voice, fax, and data. The receiver accepts the first satellite message from the antenna system and converts the first satellite message into at least one of voice, data, fax and signaling signals, at least one of the voice, data and fax signals routed to the user interface system. The receiver includes a second converter with an associated second frequency synthesizer, a demodulator, a decoder, demultiplexer, descrambler and frame unformatter for at least one of voice, fax, and data. The mobile communication system also includes a logic and signaling system, operatively connected to the transceiver, controlling initialization of the mobile communication system, obtaining an assigned outbound signaling channel from which updated system information and commands and messages are received. The logic and signaling system configures the transceiver for reception and transmission of at least one of voice, data, fax and signaling messages, and controls protocols between the mobile communication system and the mobile satellite system, and validating a received signalling messages and generating codes for a signaling message to be transmitted.

In one embodiment of the invention the logic and signaling system provides a roam function permitting the mobile communication system to roam between the mobile satellite system and a terrestrial based communication system responsive to the user selection of a primary service and an alternate service. Upon the loss of the primary service the mobile communications system waits for a first time interval before attempting to register in the alternate service and when the primary service is recovered prior to the expiration of the first time interval, the mobile communications system will not attempt to register with the alternate service. When the mobile communications system registers on the alternate service, the mobile communications system will wait a second time interval and continuously monitor the availability of the primary service, and when the primary service becomes satisfactorily available, the mobile communications system will attempt to return the registration to the primary service. When the primary service is subsequently lost a second time, the mobile communications system will wait a third time interval before attempting to register in the alternate service, and when the primary service is recovered prior to the expiration of the third time interval, the mobile communications system will not attempt registration in the alternate service. When the mobile communications system registers on the alternate service after the primary service is subsequently lost two times, the mobile communications system waits a fourth time interval and continuously monitors the availability of the primary service and when the primary service becomes satisfactorily available, the mobile communications system will attempt to return the registration to the primary service. When the mobile communications system has invoked any reregistration, a timer will be started for a fourth time interval. The timer is reset for each reregistration, and when the fourth time interval expires, the reregistration delay will be set to the first time interval. When both the primary and alternate services are lost, the mobile communications system continuously monitors the primary and alternate services, and attempts to register on whichever of the primary and alternate services that is satisfactorily available first.

In another embodiment of the invention a method is provided that includes the steps of determining whether the primary service has been lost a first time, waiting a first time interval before attempting to register in the alternate service when the primary service is lost the first time, and when the primary service is recovered prior to the expiration of the first time interval, not attempting to register with the alternate service. The method also includes when the mobile communications system registers on the alternate service, waiting a second time interval and continuously monitoring the availability of the primary service, and when the primary service becomes satisfactorily available, attempting to register on the primary service. When the primary service is subsequently lost a second time, the method includes waiting a third time interval before attempting to register in the alternate service, and when the primary service is recovered prior to the expiration of the third time interval, not attempting registration in the alternate service. When the mobile communications system registers on the alternate service after the primary service is subsequently lost two times, the method includes waiting a fourth time interval and continuously monitoring the availability of the primary service and when the primary service becomes satisfactorily available, attempting to return the registration to the primary service, and when the primary service is subsequently lost a three or more times, waiting a fifth time interval before attempting to register in the alternate service, and when the primary service is recovered prior to the expiration of the fifth time interval, not attempting registration in the alternate service. When the mobile communications system has invoked any reregistration, the method includes starting a timer for a seventh time interval, and resetting the timer for each reregistration, and when the seventh time interval expires, setting the reregistration delay to the first time interval. When both the primary and alternate services are lost, the primary and alternate services are continuously monitored, and attempts to register on whichever of the primary and alternate services that is satisfactorily available first are made.

In another embodiment of the invention, a facsimile interface unit is provided. The facsimile interface unit is operatively connected to the logic and signaling system, and generates a line control packet responsive to a line state transition indicating transmission of information associated with a new line state over a communication channel. The facsimile interface unit includes a look ahead buffer to perform early line control packet detection by looking ahead a predetermined time interval into a received satellite data stream and identifying a valid idle line control packet.

In another embodiment of the invention, a method is provided that includes the steps of generating a line control packet responsive to a line state transition indicating transmission of information associated with a new line state over a communication channel. The method also includes the step of performing an early line control packet detection by looking ahead a predetermined time interval into a received satellite data stream and identifying a valid idle line control packet, and when the idle line control packet is preceded by either a binary coded signal connection packet or a message connection packet, substantially immediately processing and removing the idle line control packet from the received satellite data stream when a first instead of a last bit of the idle line control packet is received, avoiding unnecessary modulation of invalid data.

In another embodiment of the invention a digital terminal equipment unit is included. The digital terminal equipment is operatively connected to the logic and signaling system. The digital terminal equipment unit initiates a call release for the mobile communication system by issuing a release command to the logic signaling system. When the call release is initiated by a public switched telephone network, the logic and signaling system issues a no carrier indication to the digital terminal equipment, and continuously transmits an on hook status until at least one of receiving an on-hook acknowledgment and expiration of a predetermined time interval.

In another embodiment of the invention, in a mobile satellite system, a method of the present invention provides alternate communication between the mobile satellite system and at least one of a terrestrial based communication system, and a wireless based communication system, and another mobile satellite system, using a mobile communication system responsive to selection of a primary service and an alternate service. The method comprises the steps of determining by the mobile communication system whether communication with the primary service may be accomplished, and when the mobile communication system determines that communication with the primary service may not be accomplished, attempting by the mobile communication system to communicate with the alternate service.

In yet another embodiment of the invention, in a mobile satellite system, a method of the present invention provides alternate communication between the mobile satellite system and at least one of a terrestrial based communication system, a wireless based communication system, and another mobile satellite system, using a mobile communication system responsive to selection of a primary service and an alternate service. The method includes the steps of determining whether the mobile communication system is communicable with the primary service, and when the mobile communication system is not communicable with the primary service, attempting by the mobile communication system to communicate with the alternate service. This method further includes the step of when the mobile communication system in not communicable with either of the primary and alternate services, monitoring the primary and alternate services, and attempting to communicate on one of the primary and alternate services that becomes satisfactorily available.

In another embodiment, of the invention, in a mobile satellite system, a method of the present invention provides alternate communication between the mobile satellite system designated as a primary service and at least one of a terrestrial based communication system, a wireless based communication system, and another mobile satellite system designated as an alternate service, using a mobile communication system responsive to selection of the primary service and the alternate service. The method comprises the steps of determining whether the mobile communication system is communicable with the primary service, and when the mobile communication system is not communicable with the primary service, attempting by the mobile communication system to communicate with the alternate service. This method further includes the step of when the mobile communication system in not communicable with either of the primary and alternate services, monitoring the primary and alternate services, and attempting to communicate on one of the primary and alternate services that becomes satisfactorily available.

These together with other objects and advantages which will be subsequently apparent, reside in the details of construction and operation as more fully herein described and claimed, with reference being had to the accompanying drawings forming a part hereof wherein like numerals refer to like elements throughout.

BRIEF DESCRIPTION OF THE DRAWINGS

FIG. 2 is a diagram illustrating key performance parameters of the satellite used in the satellite network system;

FIG. 19 is a diagram of the multiple operating modes of the mobile earth terminal;

BEST MODE FOR CARRYING OUT THE INVENTION

Figure 1:
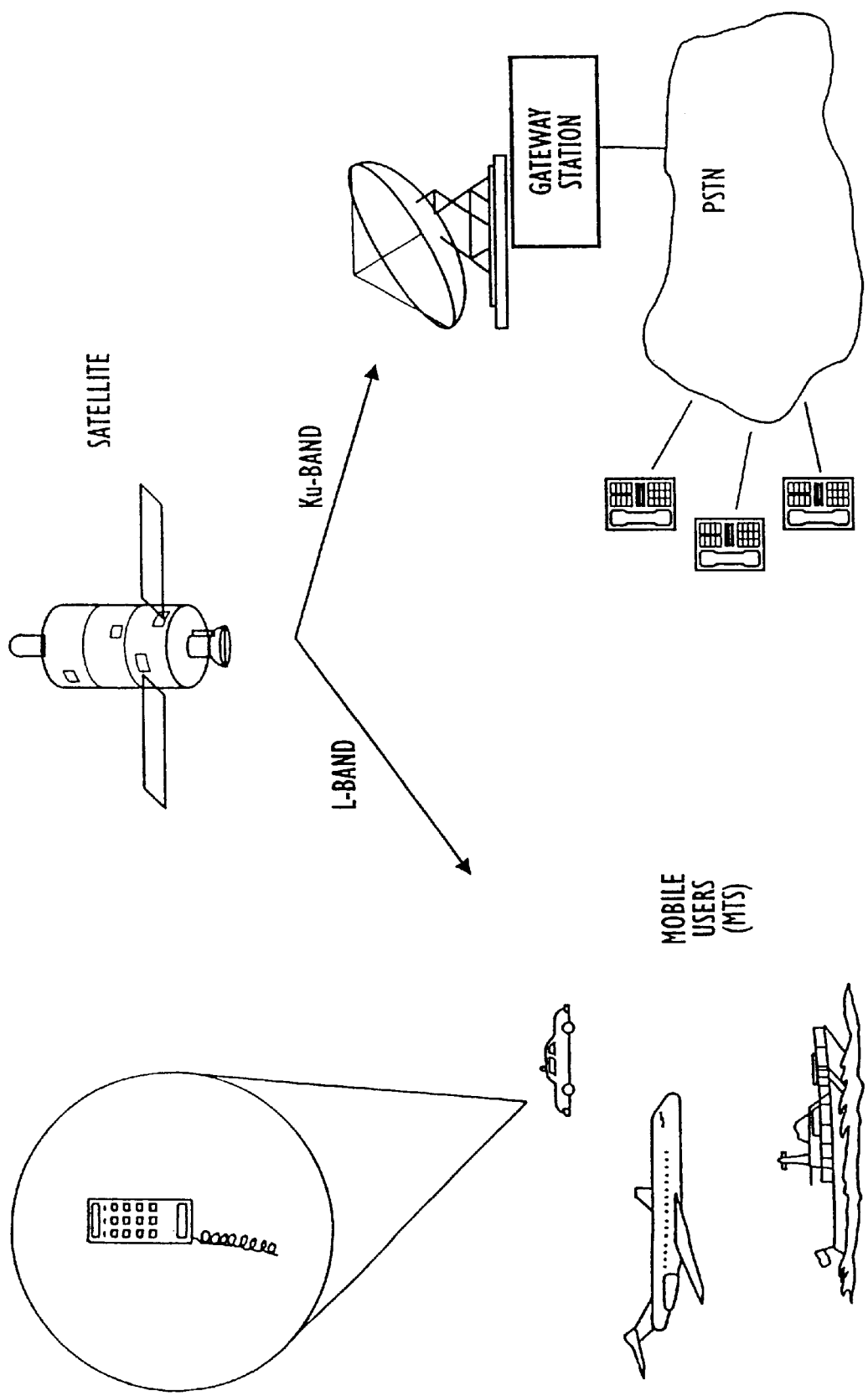
FIG. 1 is a diagram illustrating an overview of the satellite network system.
Figure 3:
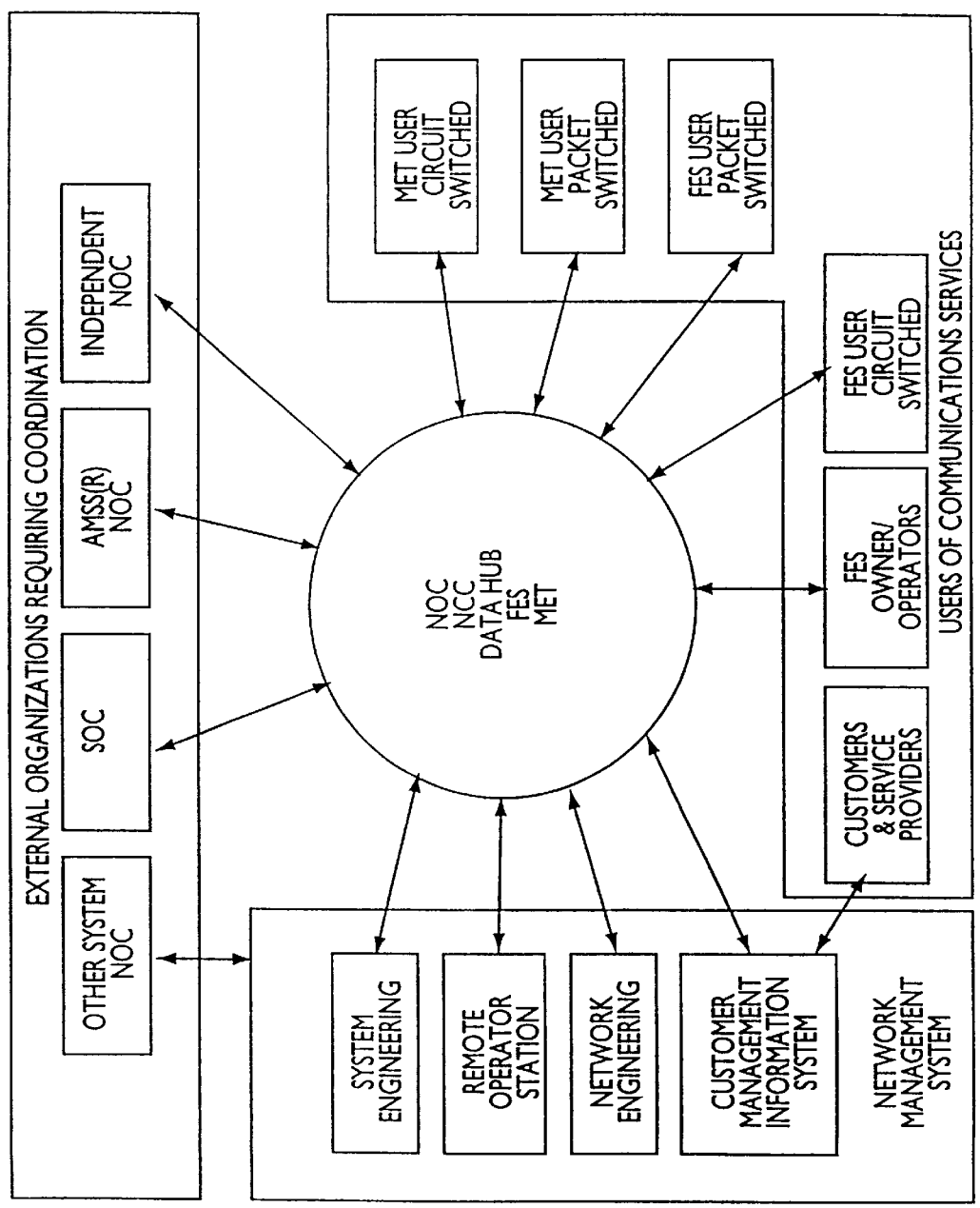
FIG. 3 is a diagram of the satellite network system illustrating components and respective interfaces.
Figure 4:
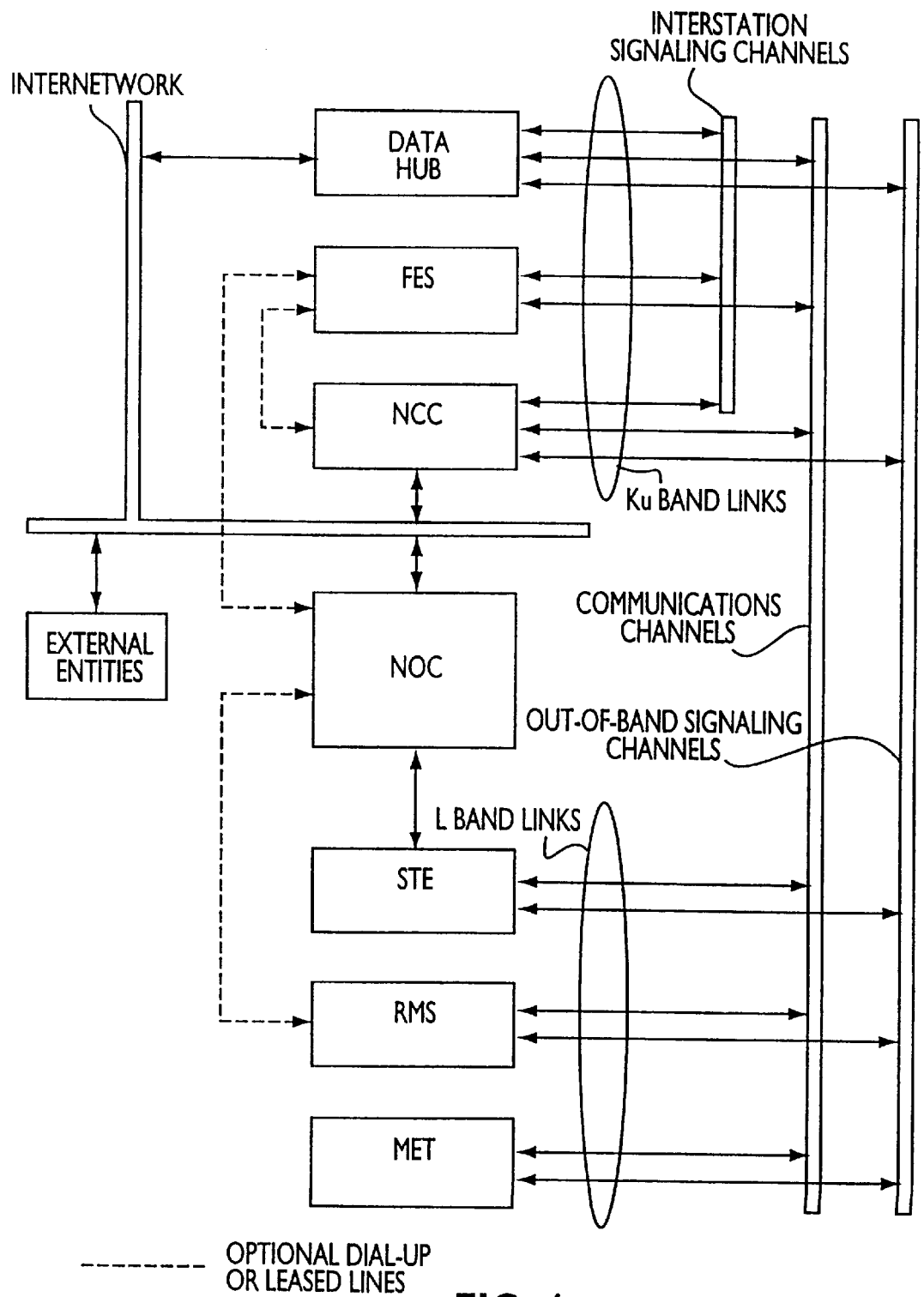
FIG. 4 is a diagram of a satellite network system illustrating a number of system elements and their interconnecting communications links.
Figure 5:
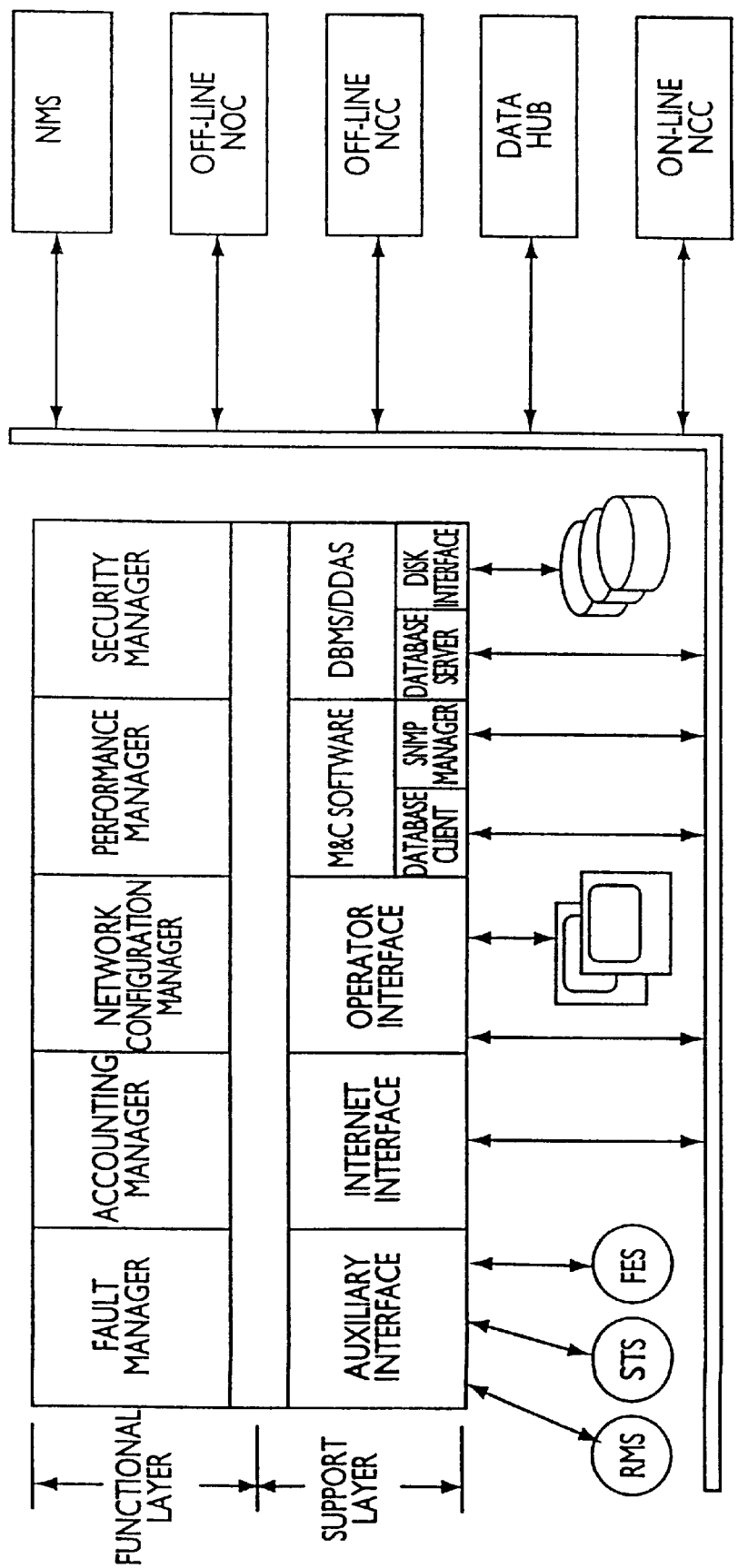
FIG. 5 is a basic block diagram of the NOC and its interfaces.

Digital speech compression means that each satellite can serve a much larger number of customers, substantially reducing the cost of the space segment. Omnidirectional antennas are also essential for personal telephones because the mobile users move. Satellites are able to transmit over obstacles from above the user.

There are generally three classes of service that can be identified:

1. Data Transmission And Messaging From Very Small, Inexpensive Satellites. Sometimes these are called the Little low earth orbits (LEO's). These systems are the space equivalent of paging systems. Examples include Orbcomm, Starsys, and VITA. The GEO predecessor was GEOSTAR, which continues to operate using small packages on Spacenet 3 and GSTAR. Orbcomm has already launched experimental satellites. The messaging data rates range from 100 to 4800 bits per second (bps).

2. Voice And Data Communications From the Big LEO's. They include Iridium, Globalstar, Odyssey, and Inmarsat P. Motorola expects to launch experimental satellites next year. All of these systems claim that they will be in service by the year 2000.

3. Wideband Data Transmission. This is the extension of the Global Information Initiative (GII). Systems proposed include Teledesic, Spaceway, and CyberStar. Several other counties and companies are working on systems of this type. These systems will offer computer to computer links and video conferencing. Higher data rates (160×9.6 kbps) 1.544 Mbps (T-1 carrier or higher).

Frequency spectrum was originally st aside for Maritime Mobile Satellite Service (MSS). The original set of bands was established with Inmarsat service in mind. These bands are in the region of 1.6 and 1.5 GHz. More recently, additional bands have been designated for Aeronautical MSS and Land MSS. These bands are also used for domestic service in the U.S., Canada, Mexico, Australia, and Japan.

The spectrum that was allocated for Radio Determination Satellite Service at WARC-88 was made coprimary with MSS at WARC-92. The U.S. FCC has allocated the top 5 MHz of the 1.6 GHz band for TDMA and the lower 11.5 MHZ for CDMA. The lower part of the 1.6 GHz band has also been used by Russian Glonass Navigation system and the Radio Astronomy service won a primary allocation for the lower part as well.

Inmarsat P has campaigned for additional service link spectrum in the new Personal Communication Service band which is also called the Future Personal Land Mobile Telephone Service (FPLMTS). Many of the developing countries and some developed countries use the $2.0/2.2$ GHz bands for terrestrial services including troposcatter and microwave links.

In addition to the question of moving service link displacement dates, special provision must be made for feeder links. This could be a more important issue than the provision of communications services, since a wider bandwidth is required for the backhaul to the Land Earth Stations. Generally, wider bandwidths are available at higher frequencies. Currently, there is major competition for spectrum all the way up to $20/30$ GHz (Ka bands).

Some of the satellite companies would like to operate in lower bands because the lower bands are less susceptible to rain attenuation and weather conditions. These bands are currently used by a number of critical services, including the Aeronautical Services. The International Civil Aviation Organization (ICAO) and the FAA use the C-band spectrum near 5 GHz for both communications and wind shear radar. Several of the Big LEO's, including Globalstar and Inmarsat P also want to use these bands.

Figure 6:
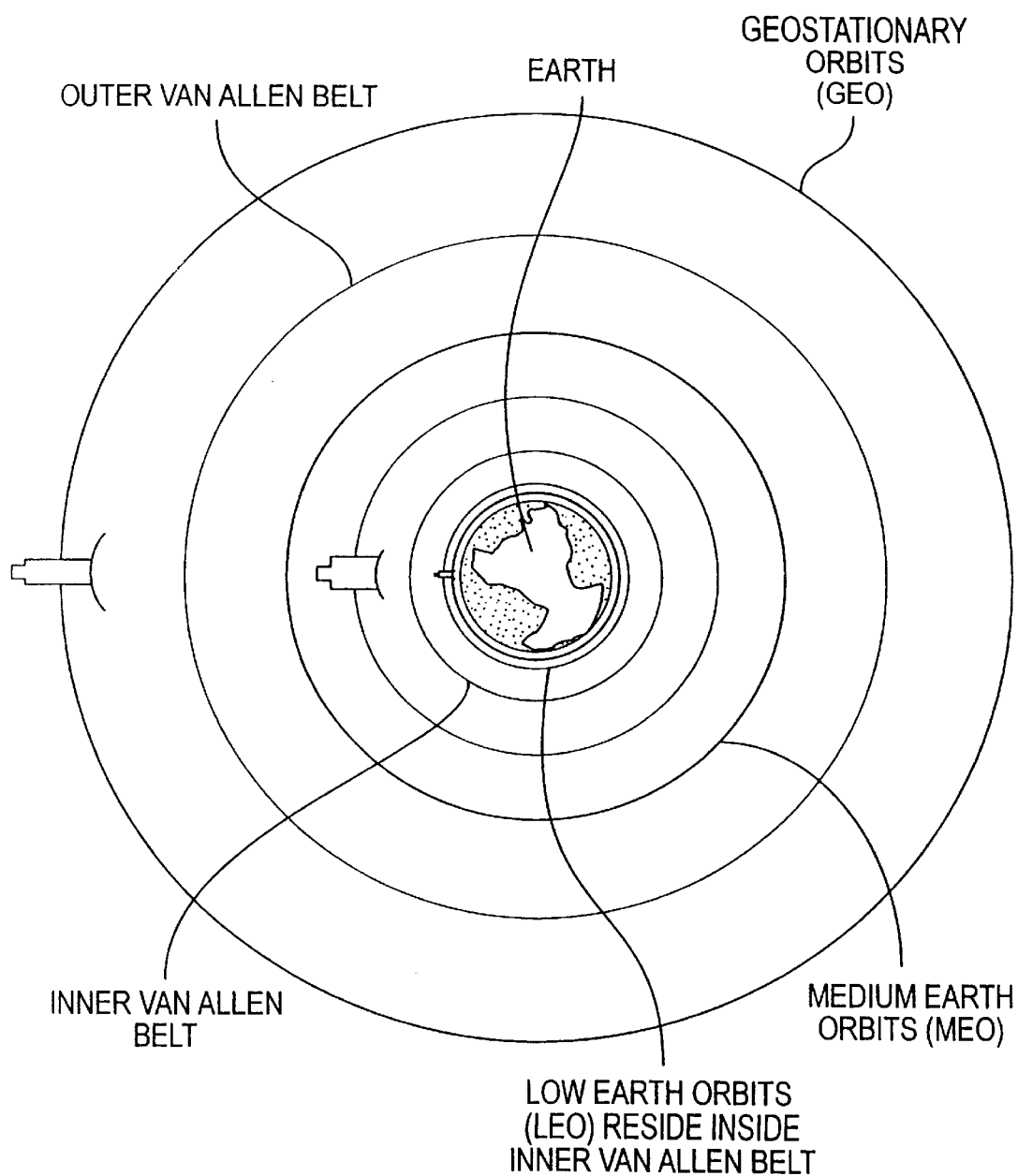
FIG. 6 shows the relative altitude of the orbits for various satellite systems.

Some of the systems would employ the use of reverse band transmissions for feeder links. This technique involves paired bands by which the Earth to space transmissions are used in the space to Earth direction and vice versa. FIG. 6 shows the relative altitude of the orbits. GEO satellites are located in orbits farthest from the Earth. Time delay is 250 msec or more plus processing delays.

Most of the non-geostationary satellites are located in LEO orbits, between the Earth's atmosphere and the inner Van Allen Belt. The inner belt contains trapped particles which have been ejected from the sun. The particles in the inner belt are high intensity, high energy electrons which are dangerous to electronic components. Collisions with satellites produce x-rays and additional energetic electrons. Shielding within the belt is not practical and satellites in this region would survive only for a few months.

Medium earth orbit (MEO) satellites take advantage of gap between the inner and outer Van Allen belts and orbit satellites in inclined orbits. This region enables service without encountering the extremely dangerous radiation levels within the Van Allen belts. Although the radiation level is about twice as intense as that for GEO, the MEO satellite can be protected by selective shielding and use of hardened electronic components.

American Mobile Satellite Corporation (AMSC)

Figure 7:
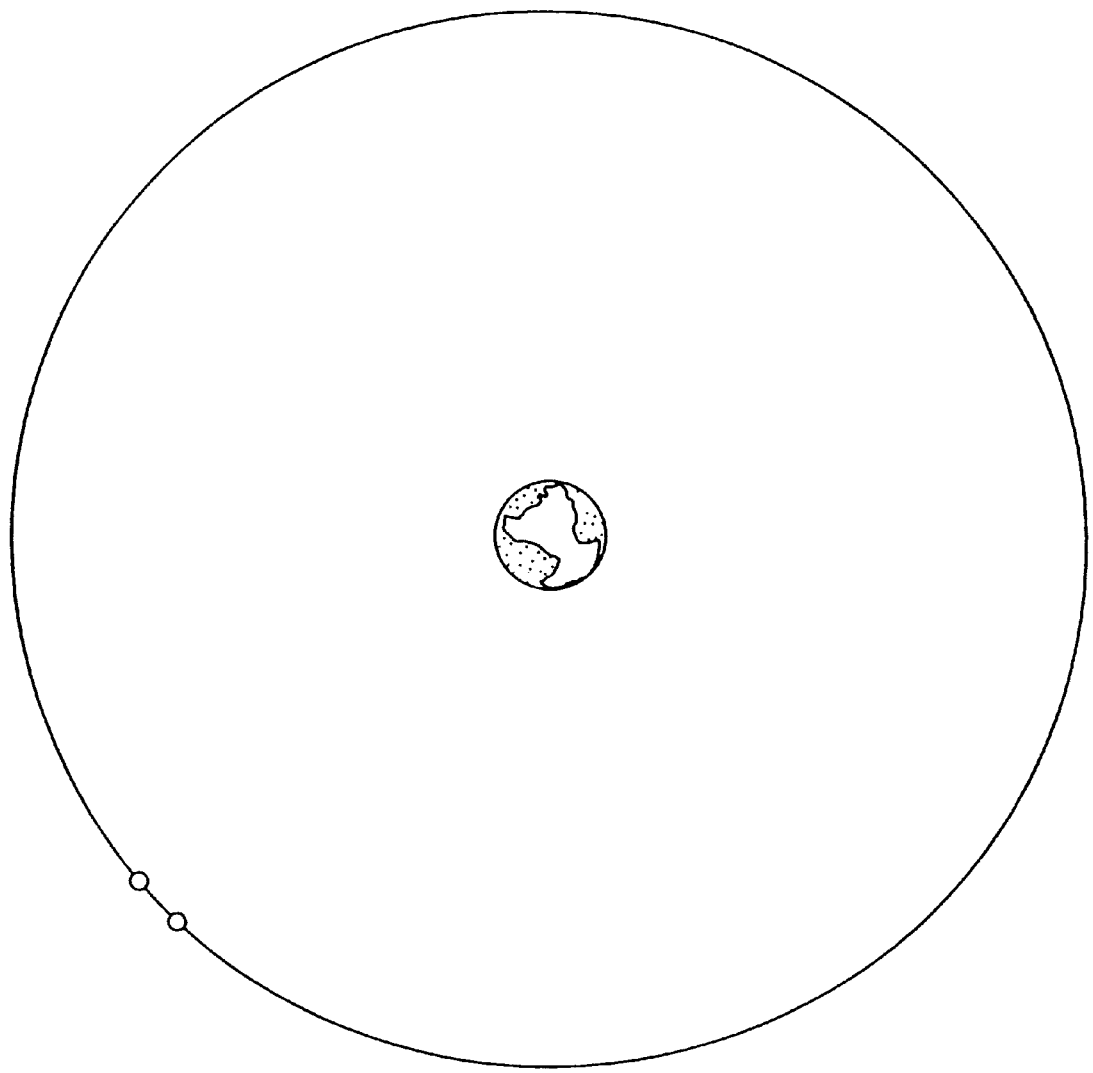
FIG. 7 is an illustration of the Geostationary Earth Orbit (GEO) satellite system for American Mobile Satellite Corp. (AMSC) designed to service vehicles with transportable terminals.

The race to provide lower cost, space based mobile communications started with the U.S. domestic proposals to the FCC by Skylink and MOBILSAT which merged with other proponents into the consortium which is called American Mobile Satellite Corp. (AMSC). This GEO system, illustrated in FIG. 7, is designed to service vehicles with transportable terminals. The satellite antennas are 5 to 6 meters in diameter. Each satellite can provide 1900 circuits.

The system is designed to provide domestic service to the U.S. and Canada. MSAT uses the existing spectrum which is shared with Inmarsat. Other countries are also using this spectrum for domestic services. The constellation includes two GEO satellites, one for AMSC and one for Telsat Mobile Inc. of Canada which is also developing a comparable service. The satellite inclination is approximately 0°, having an altitude of approximately 35,000 km. Two ground stations or control stations are provided. The access method to the system is frequency division multiple access (FDMA). The communication spectrum is approximately $1.6/1.5$ GHz, the feeder links are $13/11$ GHz, and special features include service to land mobile vehicles.

Several other systems are designed around the goal to provide a desirable, cost effective service from GEO, as well. These include the Asi-African Satellite Corp. (ASC) and the ASEAN Cellular System called ACeS. China and Singapore Telecom are proceeding with development of a GEO system called Asia Pacific Mobile Telephone (APMT).

These GEO systems are planned to provide service to hand held terminals and will require very large satellite antennas, which could be 20 meters in diameter or larger. Each satellite would be required to provide hundreds of transponders. Separate antennas would be desirable for the satellite mobile link receive and transmit functions, but this may be impractical given such large aperture antennas. If a single, large antenna is used there will be the risk of passive intermodulation products.

Orbcomm

Figure 8:
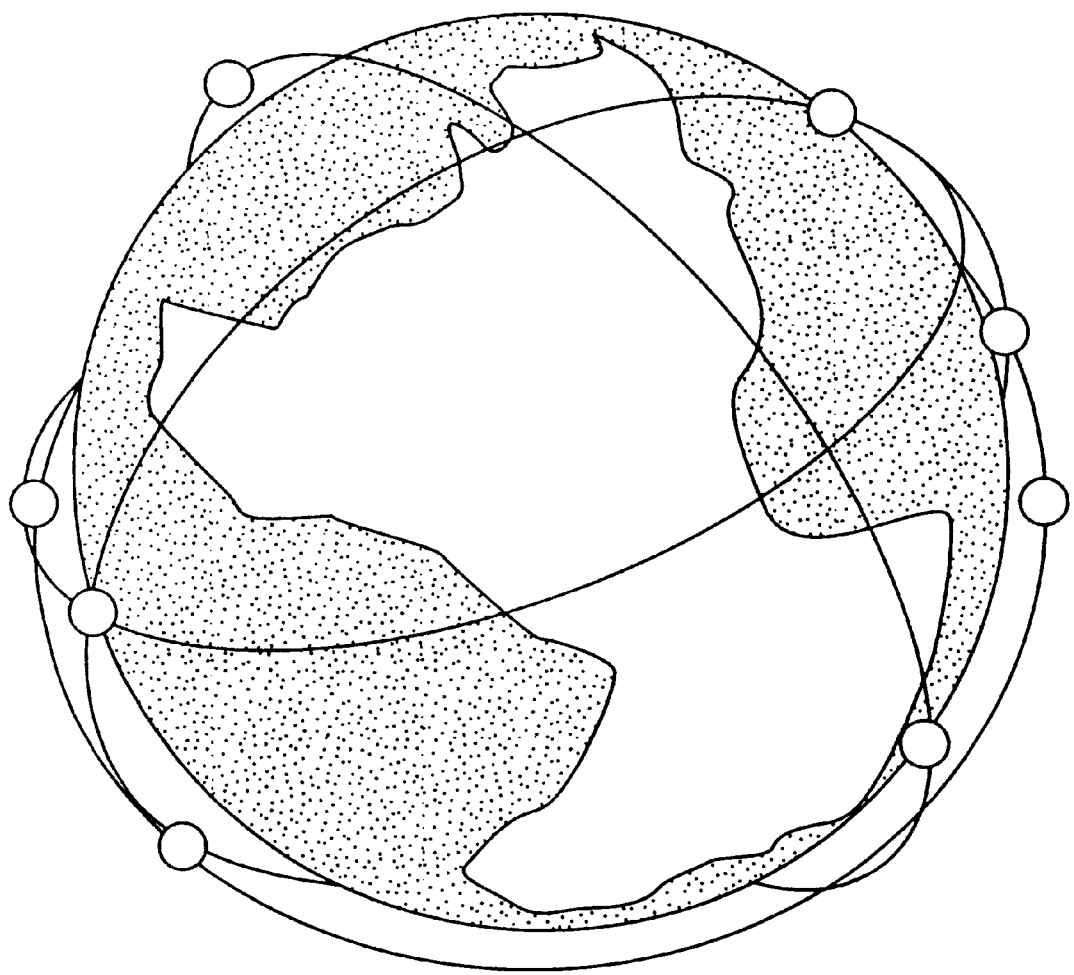
FIG. 8 is an illustration of a Low Earth Orbit (LEO) satellite system for Orbcomm designed to relay messages throughout the world by means of on board processing.

Orbcomm is one of the major players among the little LEO's and has launched two satellites. The satellite configuration for Orbcomm is illustrated in FIG. 8. This system is planned to provide real time messaging at data rates of 2400 bps from user to satellite and up to 4800 bps back to the user. The satellites are designed to relay messages throughout the world by means of on board processing.

The sponsors of the Orbcomm program include OSC/ Teleglobe. The satellite constellation includes two satellites in four orbit planes. The satellite inclination is 70° (2) 45° (24). The LEO altitude is approximately 750 km, and includes approximately four ground stations located in the United States. The communication access method is TDMA with a communication spectrum of approximately $137.5/150.0$ MHz, and feeder link spectrum of $137.5/150.0$ MHz.

Iridium

Iridium was one of the earliest systems to consider voice communications from non-geostationary orbits. Much of the exploration and optimization of space based mobile communications services has taken Iridium into consideration. Iridium is designed to provide global communications by means of state of the art electronics. The architecture reflects the need to network LEO communications in space.

Because the satellites operate from relatively low altitude (460 statute miles), each satellite can only observe about 2% of the Earth's surface at a given time. Consequently 66 satellites are needed to provide the service. The satellites therefore are frequently out of contact with land facilities which could carry transmissions into the terrestrial wireline infrastructure. Iridium attempts to overcome this obstacle by passing communications between satellites until a land Earth station can make the terrestrial connection. This architecture provides a space network which links the entire Iridium system to the Public Switched Telephone Networks (PSTNs).

Figure 9:
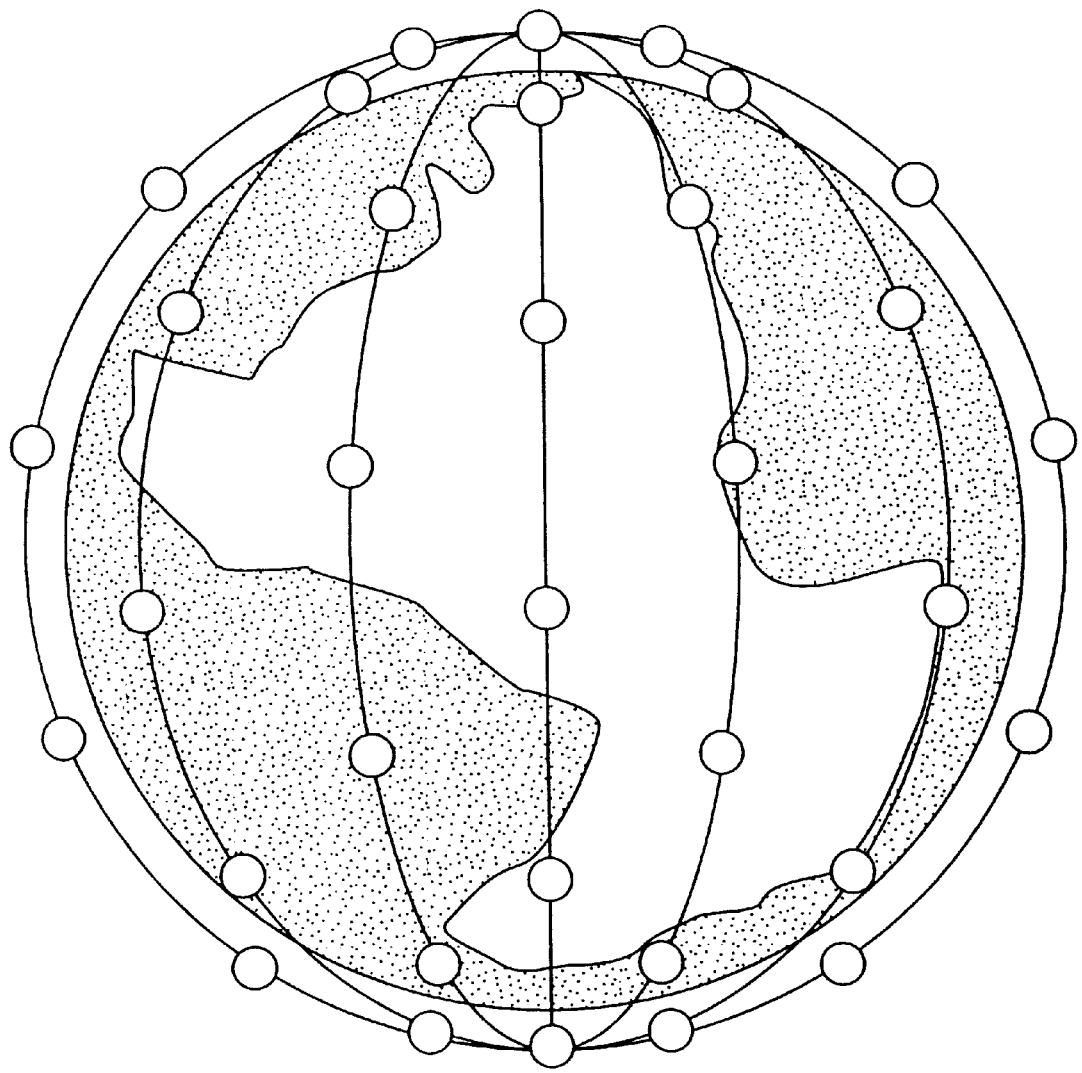
FIG. 9 is an illustration of a Low Earth Orbit (LEO) satellite system for Iridium designed to pass communications between satellites until a land earth station can make the necessary terrestrial connection, and provides a space network which links the entire Iridium system to the Public Switched Telephone Networks (PSTN)

As illustrated in FIG. 9, each satellite projects 48 beams to the Earth, and the satellites provide very high link margins. The system is designed so that one satellite beam always provides service to a given spot on the Earth. Several satellites are available to provide service in more northerly locations, but only one satellite is used. Because the satellites orbit at the low altitude, the elevation angles can be as low as 10 degrees, and the average elevation angle is about 28 degrees. These motion of 15 degrees and 35 degrees per minute.

The main sponsor of the Iridium project is Motorola. The satellite constellation includes 66 satellites in six orbit planes. The satellite inclination is approximately 90°, and the LEO altitude is approximately 740 km. Approximately twenty ground stations are used to control and/or administer the Iridium project. The communciation access method is TDMA, and the communication spectrum is approximately 1616 to 1626.5 MHz with feeder links of approximately $20/30$ GHz. Special features of Iridium include time division duplex transmission, and cross-links for global networking.

Globalstar

Figure 10:
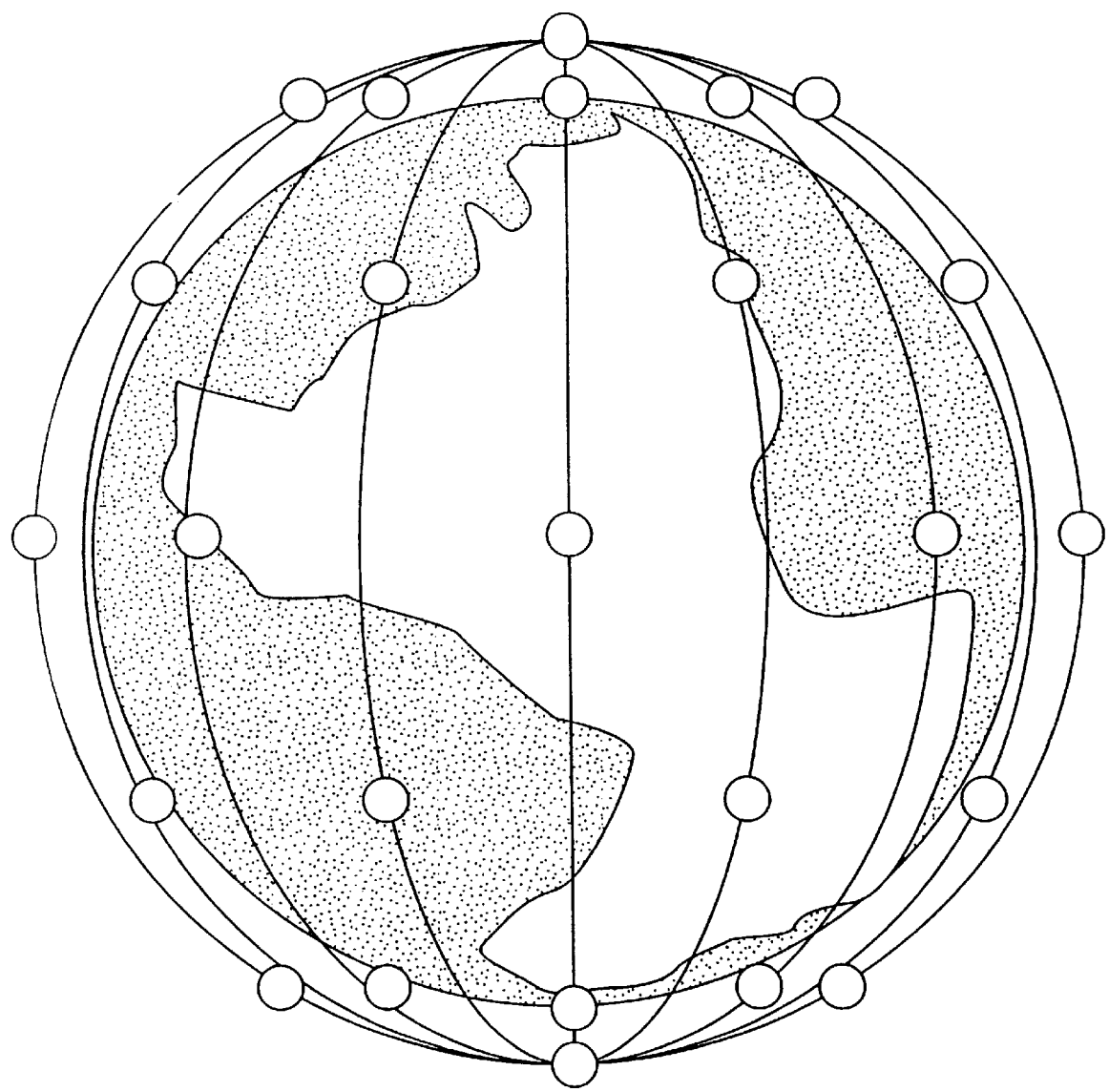
FIG. 10 is an illustration of a Low Earth Orbit (LEO) satellite system for Globalstar that does not use satellite cross links, uses CDMA communication protocol, and does not process signals on board.

FIG. 10 is an illustration of a Low Earth Orbit (LEO) satellite system for Globalstar that does not use satellite cross links, uses CDMA communication protocol, and does not process signals on board. The Globalstar satellite system is similar to Iridium. The satellites operate at a higher altitude (about 830 statute miles), and can observe as much as 5% of the surface of the Earth at a time. Consequently, service can be provided by using a somewhat smaller number of satellites (i.e., approximately 48). Each satellite is simpler than the Iridium satellites, since Globalstar does not use satellite cross links. The system uses CDMA, but the satellites do not process the signals on board. This "bent pipe" transponder approach keeps complexity low. Each satellite projects 16 beams to the Earth.

Globalstar employs spatial diversity by transmitting signals through two satellites. The Qualcomm "stereo transmission" technique reduces the amount of power required for transmission. Each handset communicates through two satellites. The two CDMA signals are combined in each handset using standard Rake receivers (which add the two CDMA signals constructively). This technique provides the most robust service when two satellites are available. The double path provides a "soft" handover from beam to beam and satellite to satellite as the constellation of satellites moves overhead.

The proponents of the Globalstar satellite system include Loral and Qualcomm. The satellite constellation includes 48 satellites in 6 orbit planes. The inclination for the satellite is approximately 470, with a LEO altitude of approximately 1390 km. The number of ground stations are approximately 90 to 200. The communication access method for Globalstar is CDMA, with a communication spectrum of approximately $1.6/2.5$ GHz, and feeder links of approximately $5/7$ GHz. Special features of the Globalstar satellite system include diversity service using "stereo" transmission.

Odyssey

Figure 11:
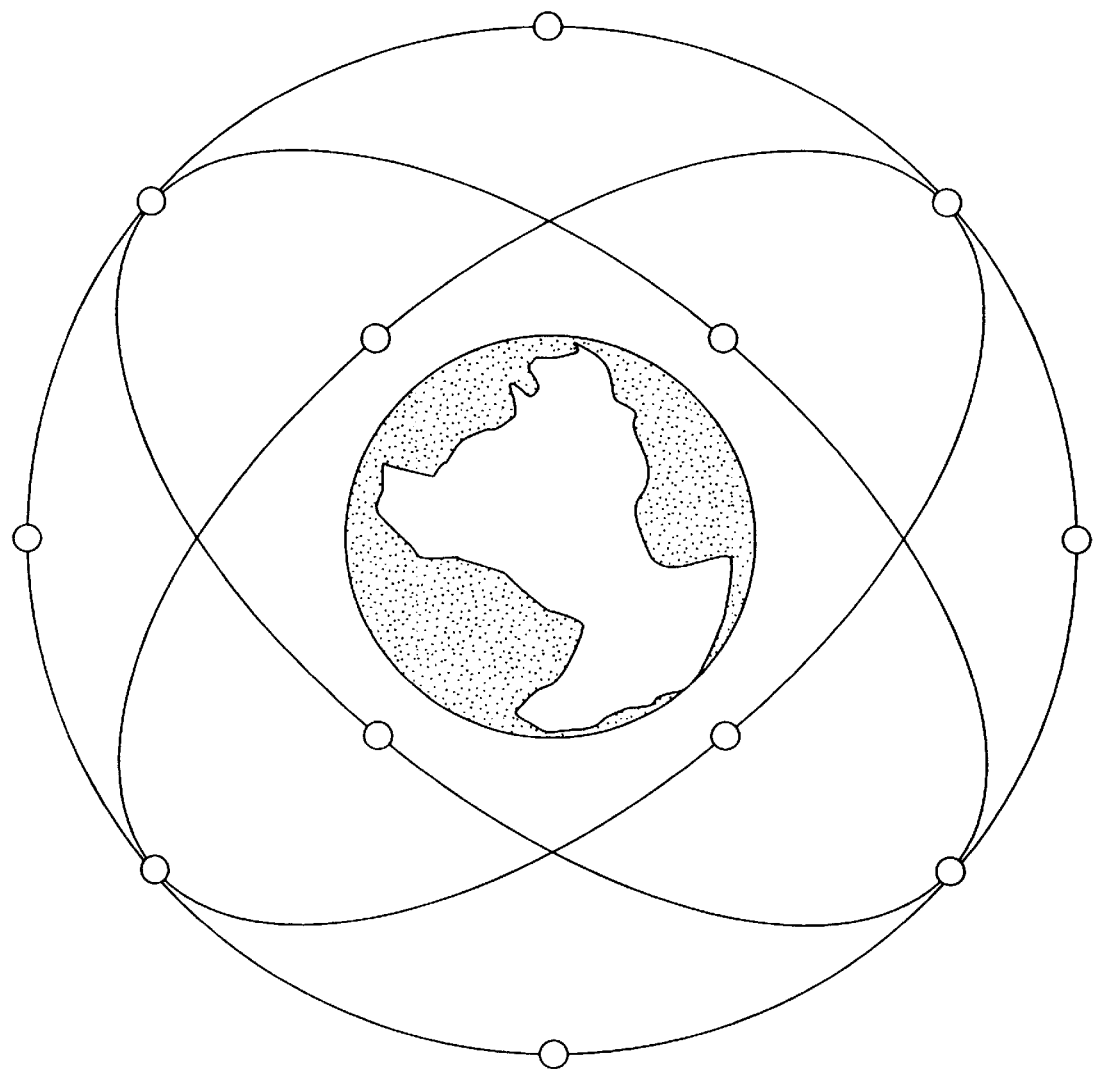
FIG. 11 is an illustration of a Medium Earth Orbit (MEO) satellite system for Odyssey with satellites operating inside the Van Allen Belts.

FIG. 11 is an illustration of a Medium Earth Orbit (MEO) satellite system for Odyssey with satellites operating inside the Van Allen Belts. Odyssey employs orbiting satellites in Medium Earth Orbit or Intermediate Circular Orbits (ICO) for mobile satellite service. The Odyssey designers recognized that a cost effective system which would not cause time delay could use a relatively small number of satellites. Furthermore, a small constellation of satellites would require a smaller number of ground antennas and less complex operations. However, this meant that the satellites would operate inside the Van Allen Belts.

These considerations led to the selection of the MEO, which can furnish initial service with only six satellites, and full global coverage with only nine satellites. With twelve satellites, at least two satellites are visible from any point in the world. The system is baselined with twelve satellites so that the satellite constellation would have built in redundancy. This configuration provides the foundation of diversity service. Satellites have an apparent motion of 10 per minute.

Odyssey provides the highest elevation angles of all the mobile satellite systems proposed for voice service. Since two or more satellites are available for service anywhere in the world, service can be routed through whichever satellite provides the better transmission. This type of diversity service provides very high availability for the user. The system is also designed with directed coverage to concentrate capacity into the regions where demand is the greatest. Less demand is expected in ocean regions, consequently the system provides only single satellite service at sea.

The proponents of the Odyssey system include TRW and Teleglobe. The satellite constellation includes twelve satellites in three orbit planes. The satellite inclination is approximately 50°, with the MEO altitude of approximately 10,350 km. The ground stations used in the Odyssey system are approximately eight. The communication access method is CDMA, with a communication spectrum of approximately $1.6/2.5$ GHz, and feeder links operating at approximately $20/30$ GHz. Special features of the Odyssey satellite system include directed coverage, and diversity service, generally from either of two satellites.

Inmarsat P (or I-CO Global)

Figure 12:
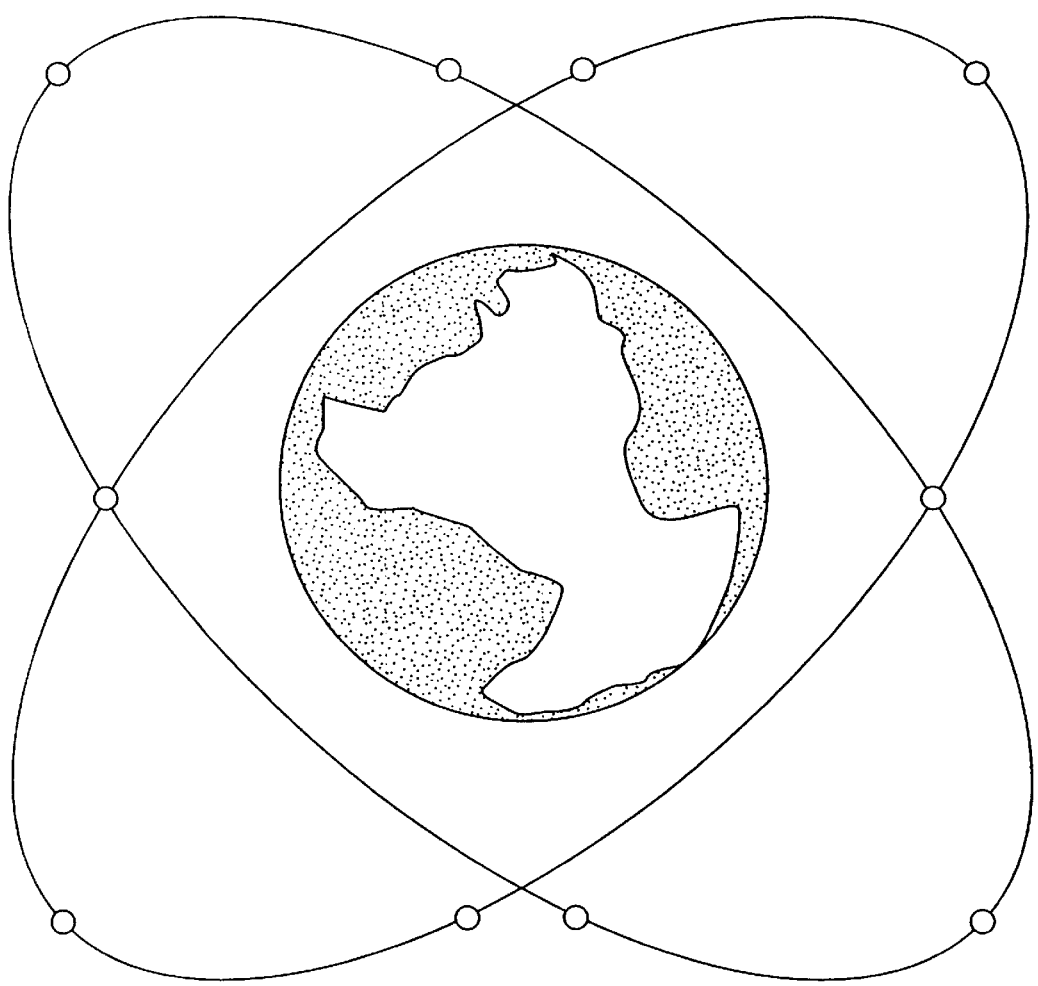
FIG. 12 is an illustration of a Medium Earth Orbit (MEO) satellite system for Inmarsat P with satellites operating inside the Van Allen Belts using the TDMA communication method.

FIG. 12 is an illustration of a Medium Earth Orbit (MEO) satellite system for Inmarsat P with satellites operating inside the Van Allen Belts using the TDMA communication method. The Inmarsat Affiliate system is very similar to the Odyssey constellation and ground infrastructure. I-CO has adopted the same altitude, nearly the same inclination, multibeam antennas, and service features, as the Inmarsat P system. Both systems orbit twelve satellites, but I-CO only operates ten satellites, and has two nonoperating spares in orbit.

Inmarsat has elected to use TDMA access, the $2.0/2.2$ GHz frequencies (which require a larger number—163 smaller beams). Ample capacity is available in ocean areas. Inmarsat P is funded by many of the same signatories that have operated the treaty based Inmarsat monopoly for the part 16 years. The satellite constellation includes at least ten satellites in two orbit planes, with a satellite inclination of approximately 450 at an altitude of approximately 10,350 km. The Inmarsat satellite system includes approximately eight to twelve ground stations with feeder links operating at approximately $5/15$ GHz. Special features of the Inmarsat system include diversity service or redundant satellite coverage area.

Teledesic

Figure 13:
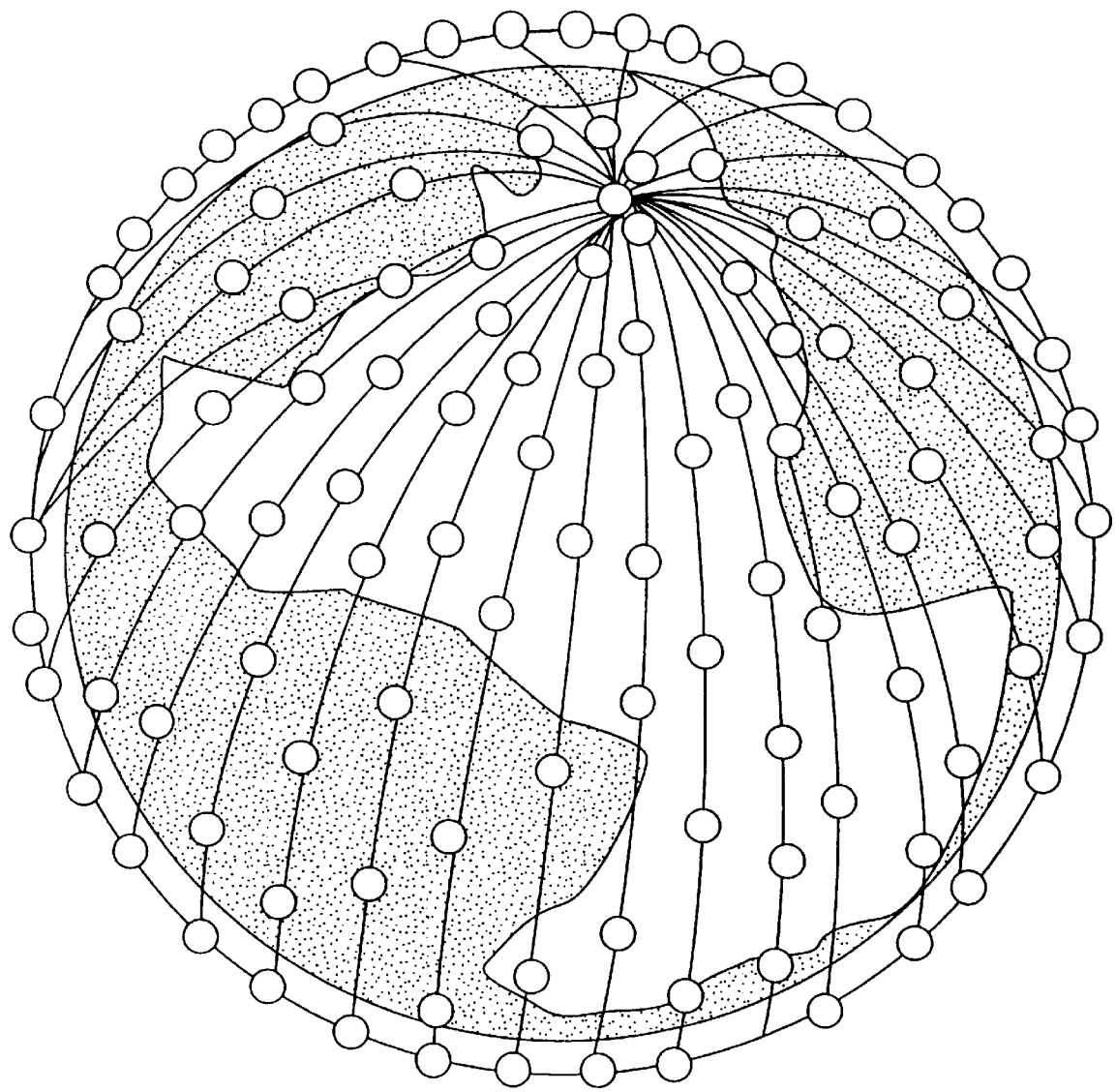
FIG. 13 is an illustration of a Low Earth Orbit (LEO) satellite system for Teledesic with satellites operating under or providing wideband data communication using TDMA communication method.

FIG. 13 is an illustration of a Low Earth Orbit (LEO) satellite system for Teledesic with satellites operating under or providing wideband data communication using TDMA communication method. Teledesic is considered to be the most ambitious service. This system would provide wideband data from LEO. The Teledesic constellation requires the largest number of satellites proposed to date. The system as proposed would provide high data rate digital communications. The constellation of 840 satellites provides service at elevation angles that always exceed 40°.

The system is planned for operation of the communication spectrum at approximately $20/30$ GHz. Transmission data rates of 1.2 Mbps (E-1) to 2 Gbps are under consideration for this system. The satellite inclination is approximately 98.2° with an altitude of approximately 700 km. Approximately sixteen ground stations are used, with feeder links at approximately $20/30$ GHz. Special features of the Teledesic system include a minimum satellite elevation angle 40°.

Spaceway and Cyberstar

Figure 14:
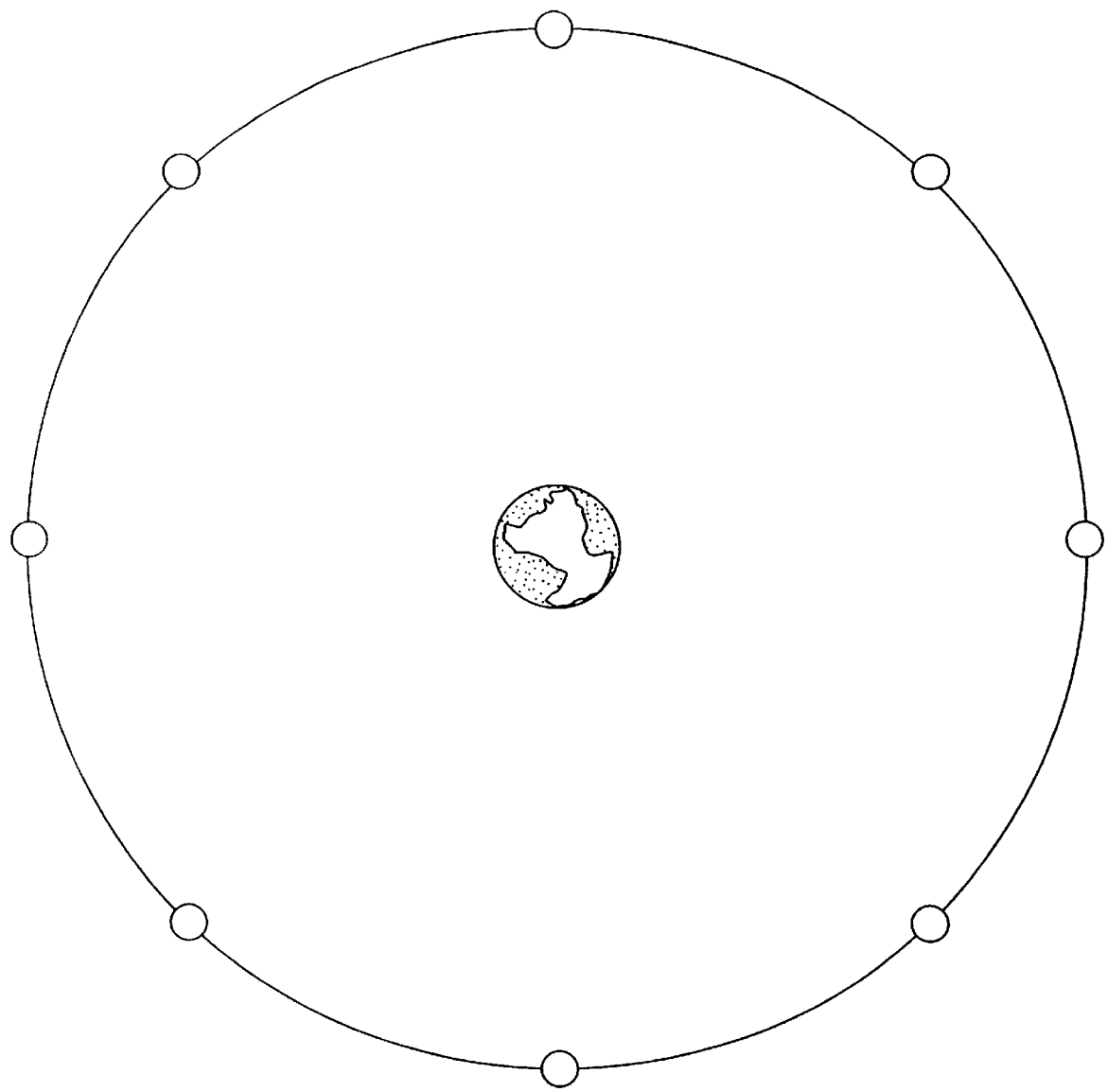
FIG. 14 is an illustration of a Geostationary Earth Orbit (GEO) satellite system for Spaceway and Cyberstar with satellites using TDMA communication method.

FIG. 14 is an illustration of a Geostationary Earth Orbit (GEO) satellite system for Spaceway and Cyberstar, with satellites using TDMA communication method. The Spaceway system has been proposed by Hughes Communications and has the same objectives as Teledesic. This system operates from GEO, and may encounter some time delay limitations in the case of interactive communications, such as video conferencing. Transmission data rates of 1.544 Mbps (T-1) are under consideration for this system.

Recently Loral filed for a similar system called CyberStar. Both applications have been accepted for processing by the FCC. The satellite constellation includes eight satellites in one orbit plane, with an inclination angle of 0°, and altitude of 35,000 km. The Spaceway and Cyberstar systems include two ground stations, utilizing the TDMA access method. The communication spectrum is approximately $20/30$ GHz, with feeder links operating under approximately $20/30$ GHz. Special features of the Spaceway and Cyberstar systems include the use of two GHz of bandwidth at Ka-band.

The above description of the various satellite systems is described in more detail in "The Market and Proposed Systems for Satellite Communications," by Roger Rusch, in Applied Microwave & Wireless, pp. 10–34 (Fall 1995), published by Noble Publishing, Tucker, Ga. 30084, the details of which are incorporated herein by reference.

Overview of MET Communication Protocol and Architecture

Figure 15:
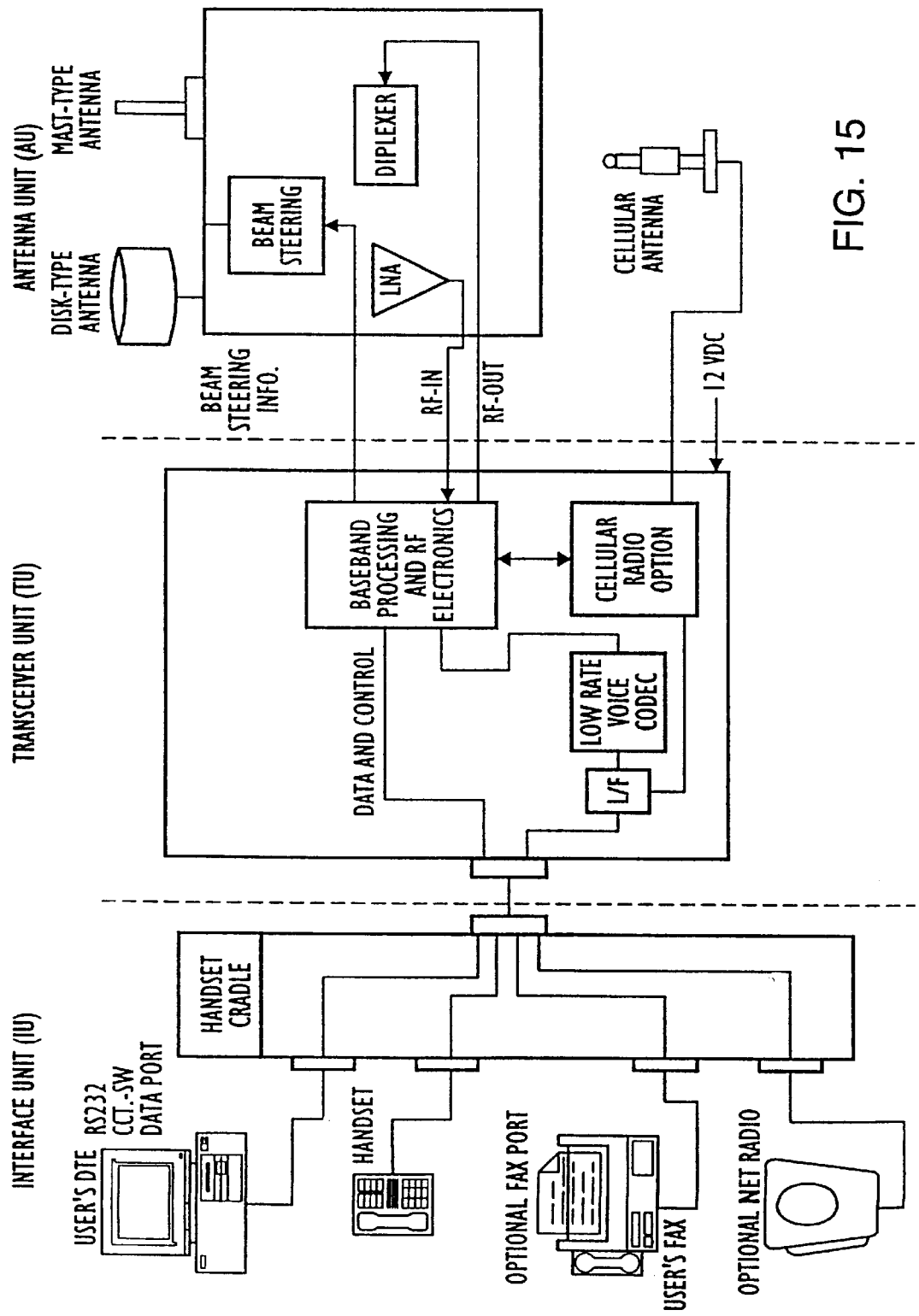
FIG. 15 is a basic block diagram of the physical architecture of the mobile earth terminal.
Figure 16:
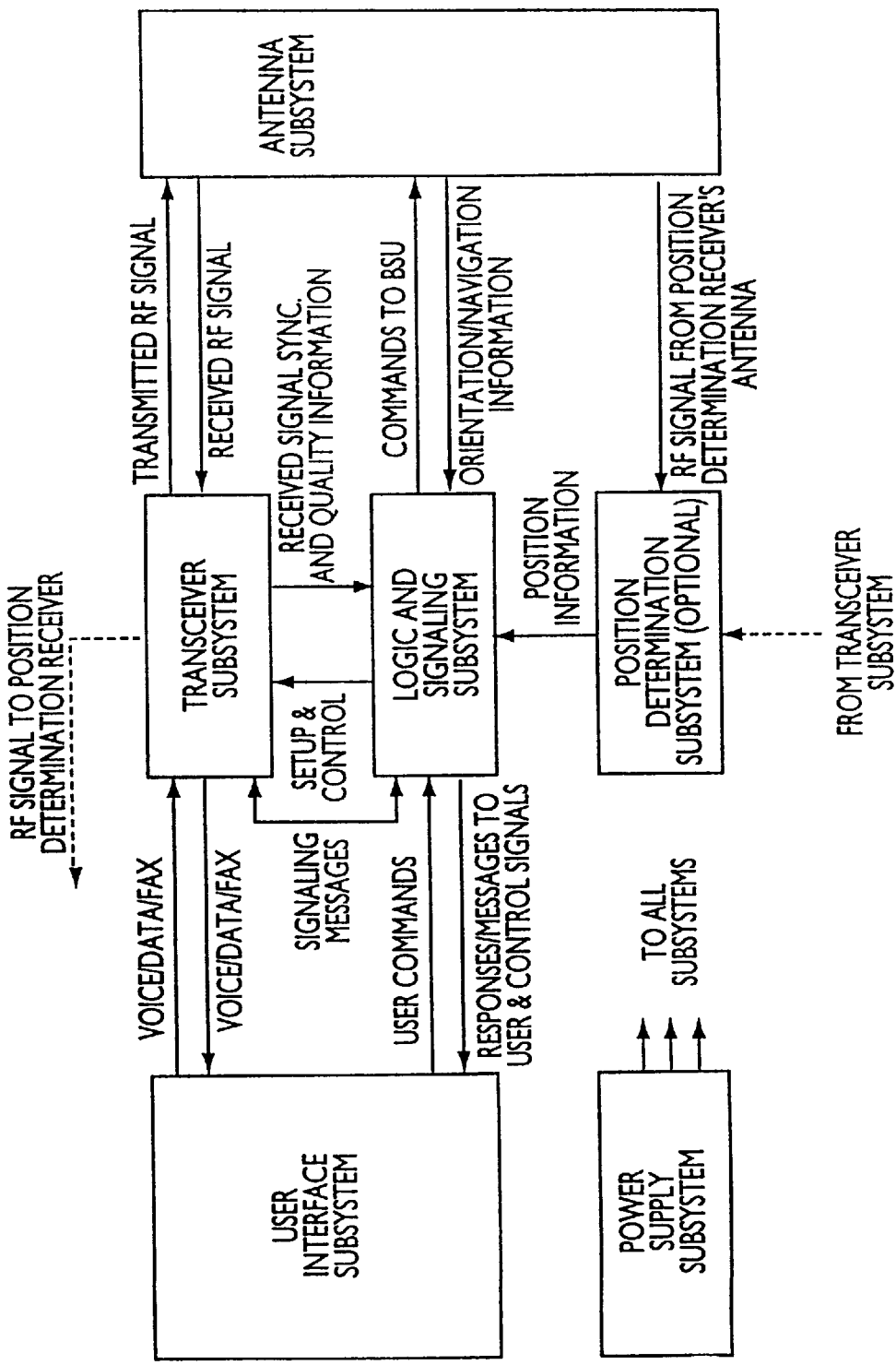
FIG. 16 is a basic block diagram of the functions of the mobile earth terminal.

While the description below focuses on the AMSC Satellite System, this description is conceptually appropriate for the other above described satellite systems. The MET includes all of the communication and control functions necessary to support communications from a vehicle or fixed remote site using the resources of the satellite network system. FIGS. 15 and 16 are basic block diagrams of the physical architecture and functions of the mobile earth terminal. The basic functional diagram of FIG. 16 is implemented by baseband processing and RF electronics of FIG. 15. A standard voice coder/decoder receives coded messages from the baseband processing and RF electronic system and decodes the message received from the satellite antenna unit for delivery to the interface unit that includes standard user interfaces. Baseband processing and RF electronics receive satellite communications responsive with low noise amplifier (LNA) and output signals for transmission using the diplexer of the antenna unit. Baseband processing and RF electronics also outputs signals for use with beam steering antennas as will be discussed blow. Advantageously, the mobile earth terminal is functional with antennas that are either steerable or nonsteerable.

The functional subsystems comprising the MET are shown in FIG. 16 and include the user interface, transceiver, antenna, logic and signaling, power supply subsystems, and Position Determination subsystem. The baseline MET will have a low gain directional antenna in the antenna subsystem. The satellite network system supports communications with METs using omnidirectional and higher gain directional antennas.

The user interface subsystem provides the user interfaces through which the user has access to the services supported by the satellite network system. Depending on the service(s) the MET will be equipped with one or more of the devices or ports. The transceiver subsystem consists of a receiver and a transmitter. The transmitter accepts voice, data, fax and signaling signals and converts them to a modulated RF signal. The transmit RF signal is routed to the antenna subsystem. The transmitter typically consists of the high power amplifier (HPA), the upconverter with its associated frequency synthesizer, the modulators and the modules for voice, Fax, or data encoding, multiplexing, scrambling, FEC encoding, interleaving and frame formatting.

Figure 17A:
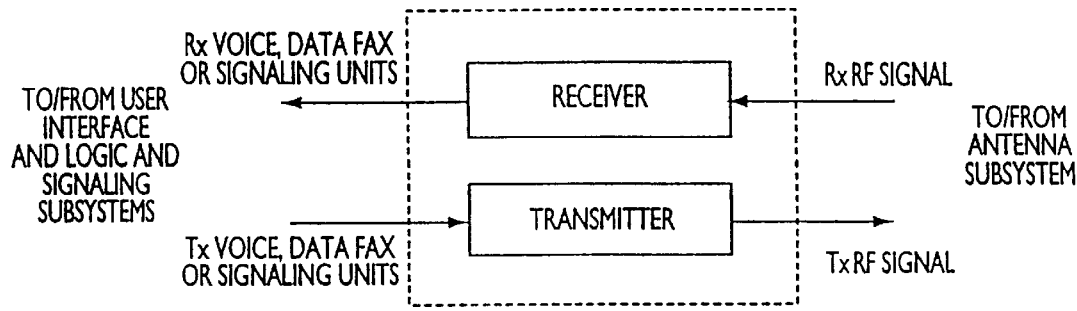
FIGS. 17a–17c are diagrams of different transceiver configurations.
Figure 17B:
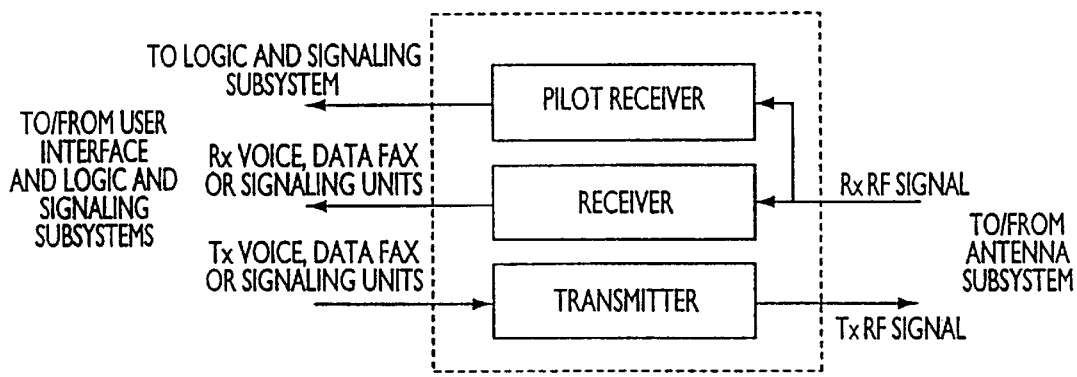
Figure 17C:
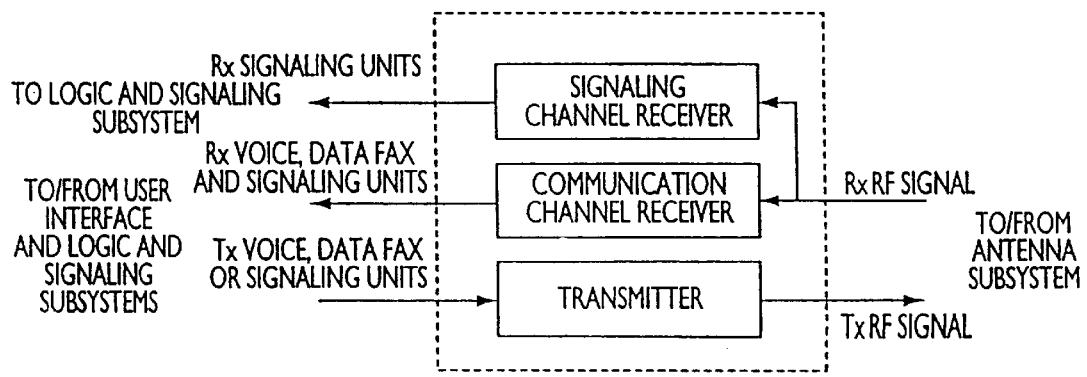

The receiver accepts modulated RF signals from the antenna subsystem and converts them into voice, data, fax or signaling signals as appropriate. The voice, data and fax signals are routed to the user interface subsystem. The receiver typically consists of the downconverter with its associated frequency synthesizer, the demodulator, and the modules for frame de-formatting, de-interleaving, FEC decoding, descrambling, demultiplexing and voice, Fax, or data decoding. The transceiver communicates over one channel in each direction at any one time. Thus, the transceiver subsystem will typically consist of only one receiver and one transmitter. However, the MET may also incorporate a pilot receiver for antennas and frequency tracking purposes, or a complete receiver dedicated to the continuous reception of the signaling channel from the Group Controller. Three different transceiver/receiver configurations are illustrated in FIGS. 17(*a*)–17(*c*).

The antenna subsystem provides the MET interface to the satellite network and is responsible for receiving the RF signal from the satellite and transmitting the RF signal generated by the MET towards the satellite. The subsystem typically includes an antenna which may be either directional or omnidirectional, a diplexer, a low noise amplifier (LNA), an optional beam steering unit (BSU) if a directional antenna is used, a device such as a compass or an inertial sensor for the determination of the orientation of the vehicle, and an antenna for the position determination receiver.

The logic and signaling subsystem acts as the central controller for the MET. Its basic functions are to initialize the MET by performing a self test at power up and control, based on a resident system table, the acquisition of one of the METs assigned outbound signaling channels from which updated system information and commands and messages from the GC are derived. The logic and signaling subsystem sets up and configures the transceiver for the reception and transmission of voice, data, fax or signaling messages as appropriate. The logic and signaling subsystem also handles the protocols between the MET and the FES and between the MET the GC via signaling messages, and checks the validity of the received signaling messages (Cyclic Redundance Check (CRC)) and generates the CRC codes for the signaling message transmitted by the MET.

The logic and signaling subsystem also interprets the commands received from the local user via the user interface subsystem (e.g. on/off hook, dialled numbers, etc.) and take the appropriate actions needed, and generates, or commands the generation, of control signals, messages and indications to the user through the user interface subsystem. The logic signaling system also controls the beam steering unit (if any) in the antenna subsystem, and monitors and tests all the other subsystems. In case of fault detection, it informs the user about the failure and take the appropriate measures needed to prevent harmful interference to the satellite network or other system.

The power supply subsystem provides power to all other subsystems. The external voltage source to which this subsystem interfaces depends on the type of vehicle on which the MET is mounted (e.g. $12/24$ Volts DC for land vehicles).

A standard receiver such as a GPS or a Loran-C receiver is also provided for the determination of the position of the vehicle. This information is used by the logic and signaling subsystem for beam steering (if used) or for applications such as position reporting. The position determination system is implemented externally to the MET and interfaced through a dedicated data port in the user interface subsystem.

The function of the Remote Monitor System is to continuously monitor the activity on each GC-S channel and to monitor the activity within the downlink L-band spectrum in the beam in which it is located. An RMS will be located in every beam carrying satellite network traffic. An RMS may be a stand alone station or collocated with the NCC or an FES. The RMS is controlled by the NOC and communicates via leased lines or the interstation signaling channels if collocated with an FES. The RMS detects anomalous conditions such as loss of signal, loss of frame sync, excessive BER, etc. on the GC-S channels and generates alarm reports which are transmitted to the NOC via the leased line interface. In addition, it monitors BER on any channel and power and frequency in any band as instructed by the NOC.

The primary functions of the System Test Stations (STS) is to provide commission testing capability for every channel unit in a FES and to provide readiness testing for the Off-Line NCC. The STS is collocated with and controlled by the NOC and will comprise one or more specifically instrumented METs. The STS provides a PSTN dial-up port for making terrestrial connections to FESs to perform MET to terrestrial end-to-end testing. The STS also provides a LAN interconnection to the NOC to provide access to operator consoles and peripheral equipment.

Advantageously, the MET combines three different features for the delivery and transmission of voice and data. These three features include: the ability to initiate and transmit a data call, the ability to initiate and transmit a facsimile digital call, and the ability to roam between satellite and terrestrial based wireless communication systems. The following documents, representing applicable transmission protocols, are hereby incorporated by reference: EIA/IS-41B Cellular Radio Telecommunications Inter-System Operations; EIA/TIA-553-1989 "Cellular System Mobile Station—Land Station Compatibility Standard"; EIA/TIA-557; EIA/IS-54B.

MET Roaming

Figure 18:
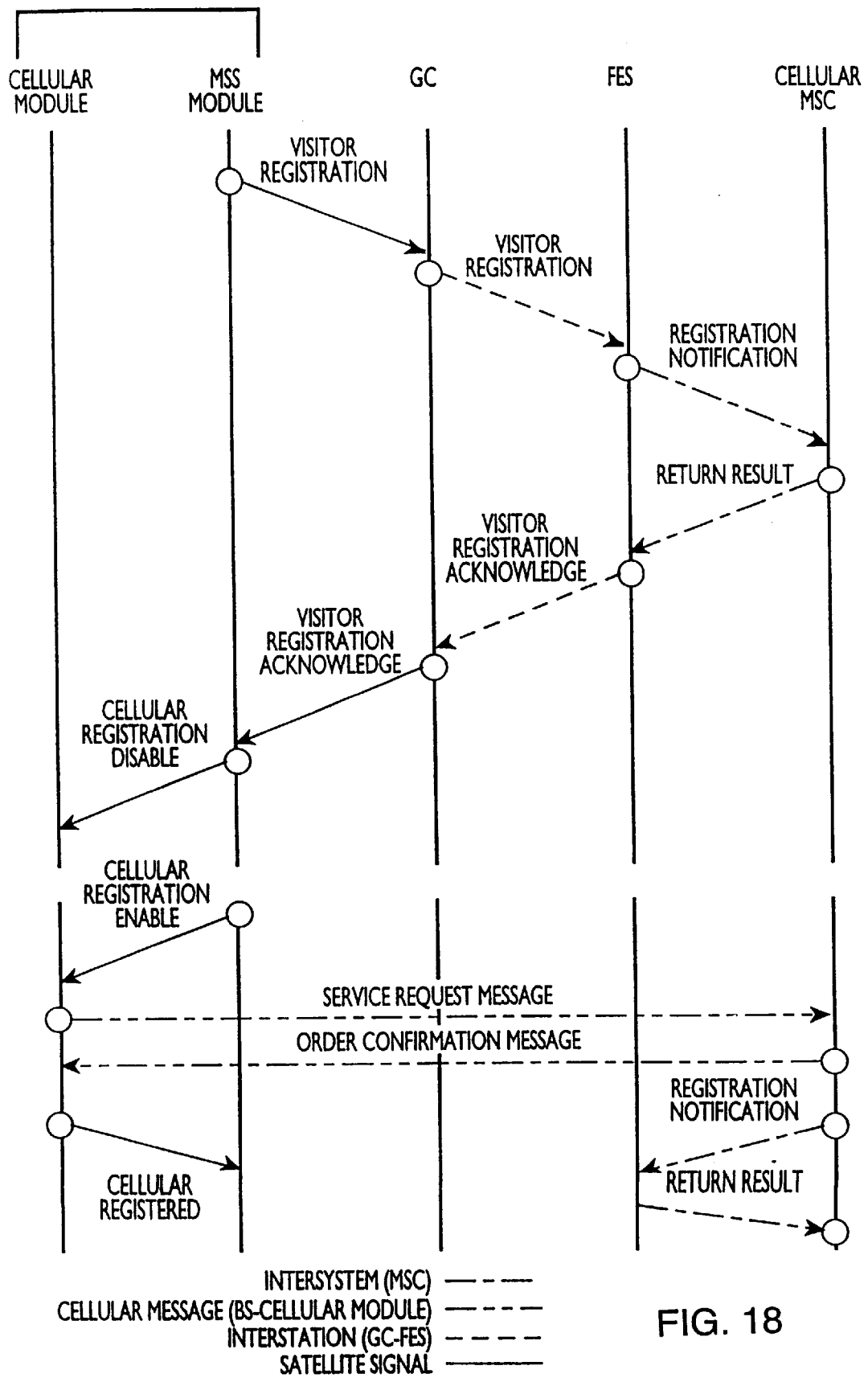
FIG. 18 is a diagram of a visitor registration sequence of the MET.

The Mobile Telephone Cellular Roaming Service (MTCR) supplements cellular service, providing access where there is no cellular coverage. The "home" Mobile Switching Center (MSC) of the multimode MET, as defined in EIA/IS-41B, is either the terrestrial cellular mobile carrier (CMC) system or the satellite network system. The MET registers as a "visitor" in either the satellite MSC or a terrestrial cellular system MSC per the requirements of EIA/IS-41B. The visitor registration sequence is provided in FIG. 18. The gateway provides automatic roaming for METs outside the range of terrestrial cellular coverage in accordance with EIA/IS-41B. METs are identified with the same 10-digit telephone number in the terrestrial cellular and satellite networks.

In the idle state, a mobile unit monitors the cellular and satellite signaling channels. The normal cellular procedure is used for terrestrial calls as defined in EIA/TIA 557. Each MET uses the cellular terminal ESN (electronic serial number) and the telephone number for the purposes of identification and registration on the CMC. Upon power up, the MET registers per the requirements of FIG. 19. If unsuccessful, it registers in accordance with the secondary selection, if applicable. If the mobile is in the coverage area of selected preferential service, the MET will not attempt to register as a roamer in another system until the MET detects the absence of preferential coverage. At that time, the MET attempts to register on the secondary coverage system as a roamer.

If the MET is registered in a secondary coverage system as a roamer, and detects the availability of preferential coverage, it attempts to register (reregister) with the preferential system. However, once a call is established on the satellite system, it remains on the satellite system until completion. Reregistration only occurs after a suitable time delay at the MET to avoid constantly switching between networks. For all reregistrations, a suitable time delay is defined as follows. The MET, upon the loss of a primary service (satellite or cellular) waits, for example, a nominal 6 seconds before attempting to register in the alternate service (cellular or satellite). If the primary service is recovered prior to the expiration of the 6 second delay, the mobile will not attempt reregistration. When registered on the alternate service, the MET will wait a nominal 6 seconds, and will then continuously monitor the availability of the primary service. When the primary service becomes satisfactorily available, the MET will attempt to return the registration to the primary service.

If the primary service is subsequently lost again, the MET will wait a nominal 15 seconds before attempting to register in the alternate service. If the primary service is recovered prior to the expiration of the 15 seconds delay, the mobile will not attempt reregistration. When registered on the alternate service, the MET will wait a nominal 15 seconds, and will continuously monitor the availability of the primary service. When the primary service becomes satisfactorily available, the MET will attempt to return the registration to the primary service. If the primary service is subsequently lost again (a third or more times), the MET will wait a nominal 30 seconds before attempting to register in the alternate service. If the primary service is recovered prior to the expiration of the 30 second delay, the mobile will not attempt reregistration. When registered on the alternate service, the MET will wait a nominal 30 seconds and will then continuously monitor the availability of the primary service. When the primary service becomes satisfactorily available, the MET will attempt to return the registration to the primary service.

Once the MET has invoked any reregistration, a 5 minute timer will be started. The timer will be reset to 5 minutes for each reregistration. If the 5 minute timer expires, the reregistration delay will be set to a nominal 6 seconds and the cycle will start over again. If both services are lost, the MET will continuously monitor both services, and will attempt to register (reregister) on whichever service becomes satisfactorily available.

Met Data Call

Figure 20A:
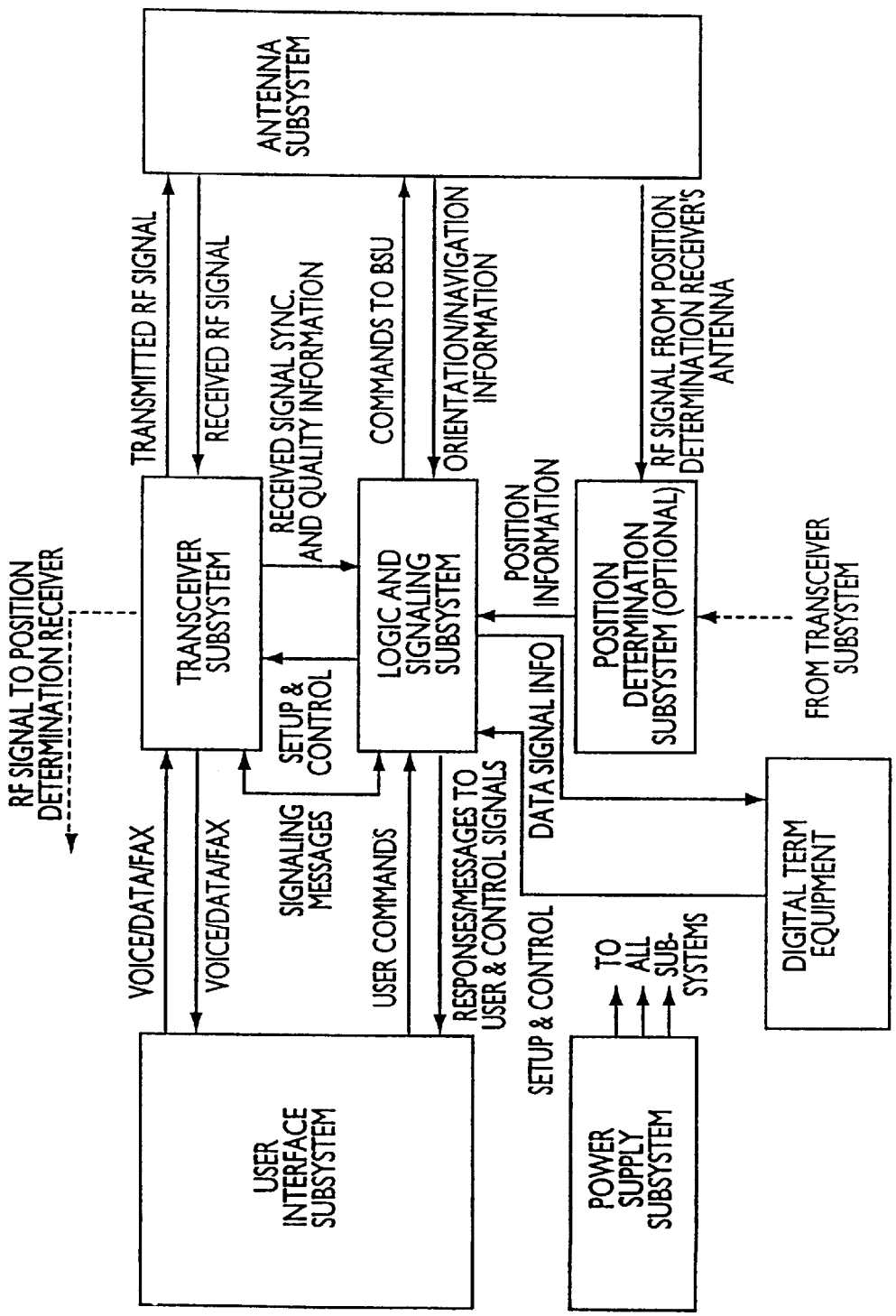
FIG. 20a is a basic block diagram of the functions of the mobile earth terminal including the digital terminal equipment functions.

FIG. 20a is a basic block diagram of the functions of the mobile earth terminal including the digital terminal equipment functions. The calling procedures for MET initiated data calls permit standard data terminal equipments (DTEs) connected to METs to place 2400 bps and 4800 bpsdata calls to appropriately equipped subscribers of the PSTN or members of private networks, similar to a data call by a standard modem. As discussed below, however, additional functions are required to effectuate the data call in the MET environment. The 2400 bps mode has a fall back rate of 1200 bps. The frame and data field formats for 1200 bps is identical to that for 2400 bps.

Figure 20B:
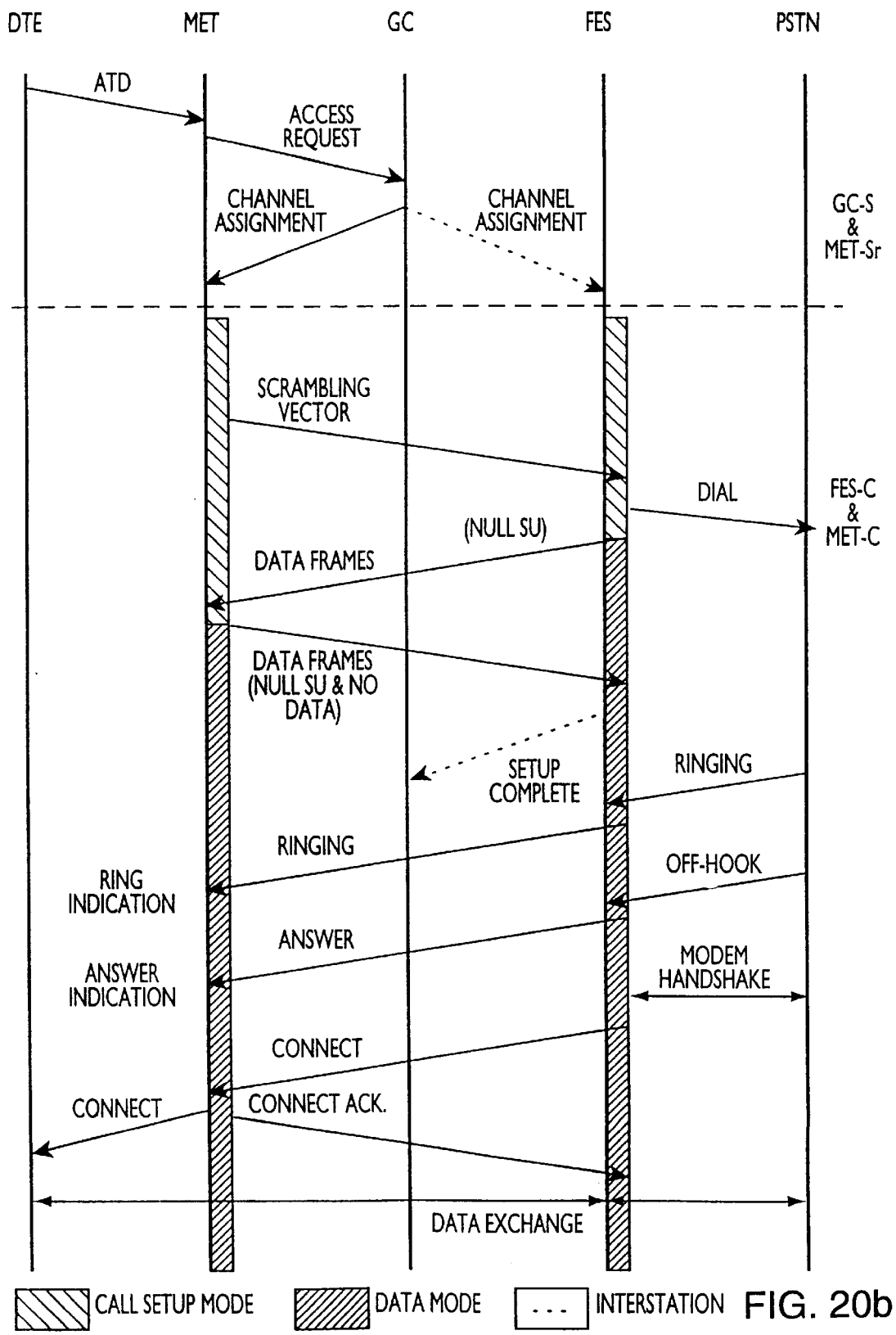
FIG. 20b is a diagram of a data call setup sequence between the MET and a PSTN.
Figure 21:
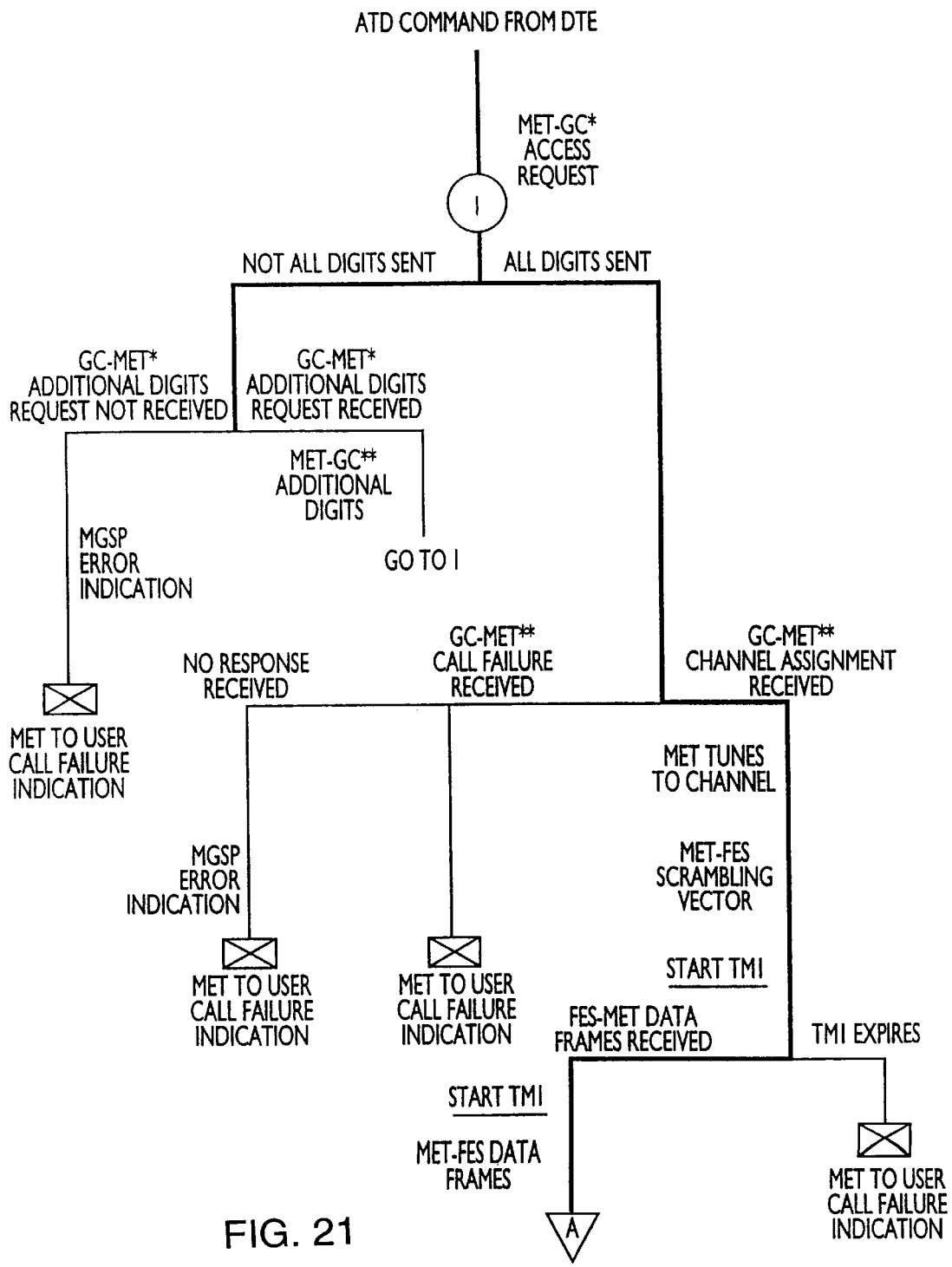
FIGS. 21–22 are event tree diagrams of a call setup sequence between the MET and a PSTN.
Figure 22:
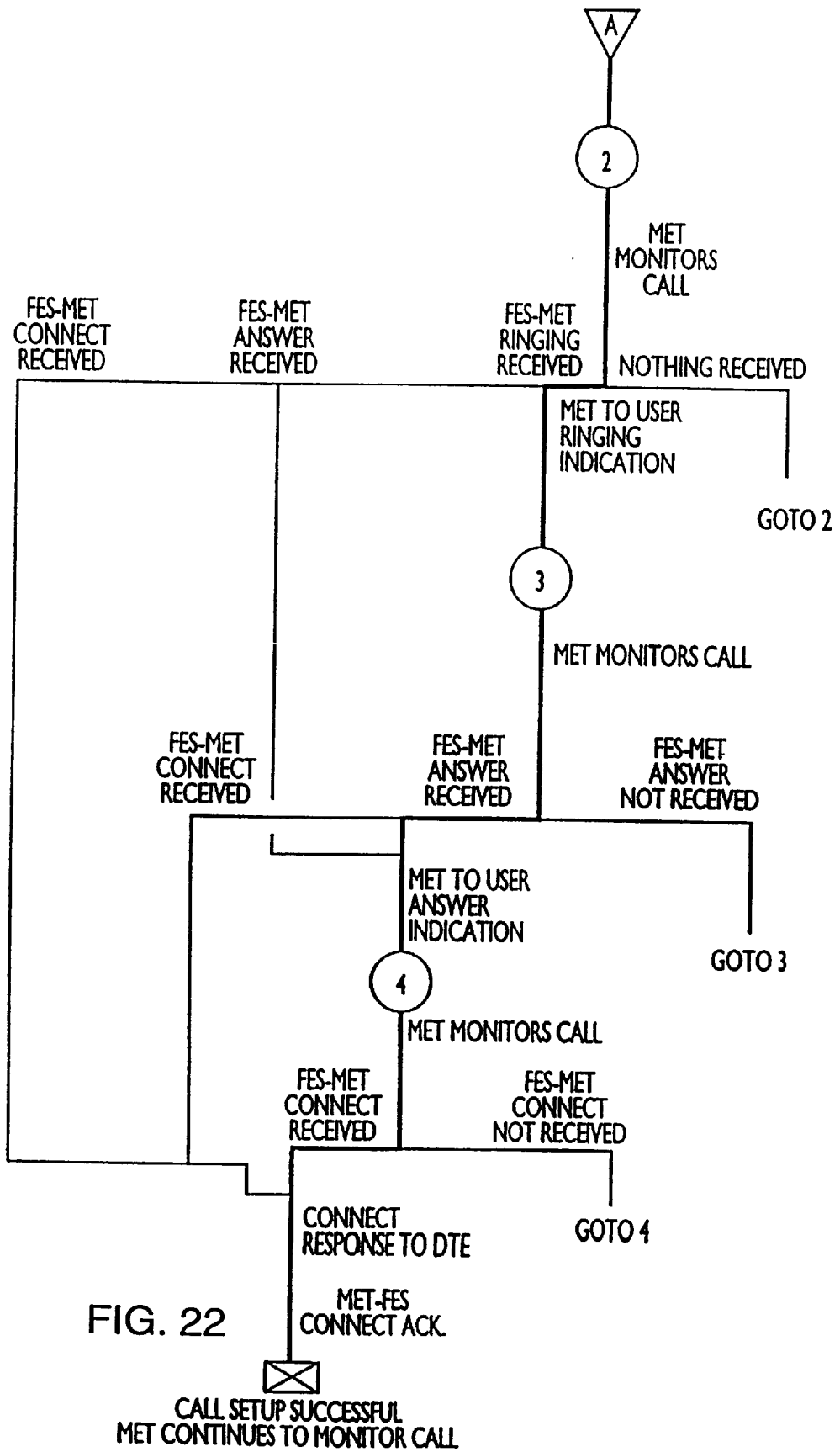

The AT command set is a set of commands commonly used for exchange of control information between DTEs and dial up modems. DTEs connected to the MET use a subset of the AT command set to send commands to the MET and receive responses from the MET. The message sequence shown in FIG. 20b used to establish MET originated data calls. The protocol employed is specified in the event tree given in FIGS. 21–22. A data call is initiated by the transmission of an ATD command from the DTE to the MET. The ATD command contains the telephone number of the destination modem/DTE. The ATD command also contains the desired transmissions speed and the character format to be used.

The message type field of the access request SU indicates that the call is a data call. Upon reception of the MET channel assignment SU, the MET transmits a scrambling vector SU to the FES via the MET-C channel. This message is continuously repeated until data frames are received from the FES. If no response is received after 5 seconds the MET ceases transmission and signals call failure to the user. The scrambling vector SU contains the initial scrambling vector to be used by the FES on the FES-C channel, the access security check field generated by the MET, and the desired character format and line speed for the connection.

Upon successful reception of the scrambling vector SUs, the FES will compare the access security check fields received from the GC and the MET and initiate call release if the fields are not identical. If the access security check fields are identical, the FES will seize a circuit into the PSTN and initiate establishment of the terrestrial portion of the connection. The FES will also switch to data mode and begin transmitting data frames to the MET. Upon reception of the data frames from the FES the MET switches from the call setup frame mode to the data frame mode and continuously transmits data frames to the FES with NULL SUs in the in-band signaling frames until a "connect" SU is received from the FES. For $1200/2400$ bps data calls, the MET and FES transmit null SUs in the SU field.

Upon receiving data frames from the MET, the FES will begin transmitting ringing SUs to the MET in the in-band signaling field of the data frames. Upon detection of the PSTN going off-hook, the FES will stop sending ringing SUs and will begin transmitting answer SUs to the MET in the in-band signaling field of the data frames. Upon completion of the handshake and bit rate selection procedures between the FES terrestrial modem and the PSTN user modem, the FES will stop transmitting answer SUs and will begin transmitting "Connect" SUs to the MET. Upon receiving a "Connect" SU from the FES, the MET continuously transmits "Connect Acknowledgment" SUs. Upon receiving a "Connect Acknowledgment" SU from the MET, the FES will cease transmitting connect SUs to the MET.

Figure 23:
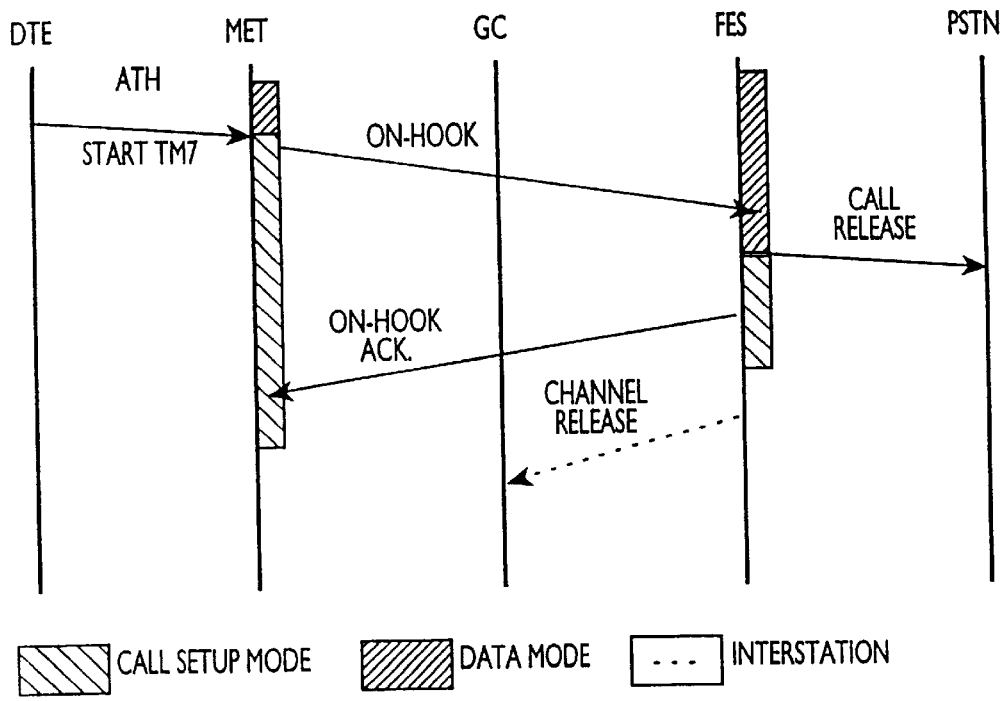
FIG. 23 is a diagram of a call release sequence initiated by the MET.
Figure 24:
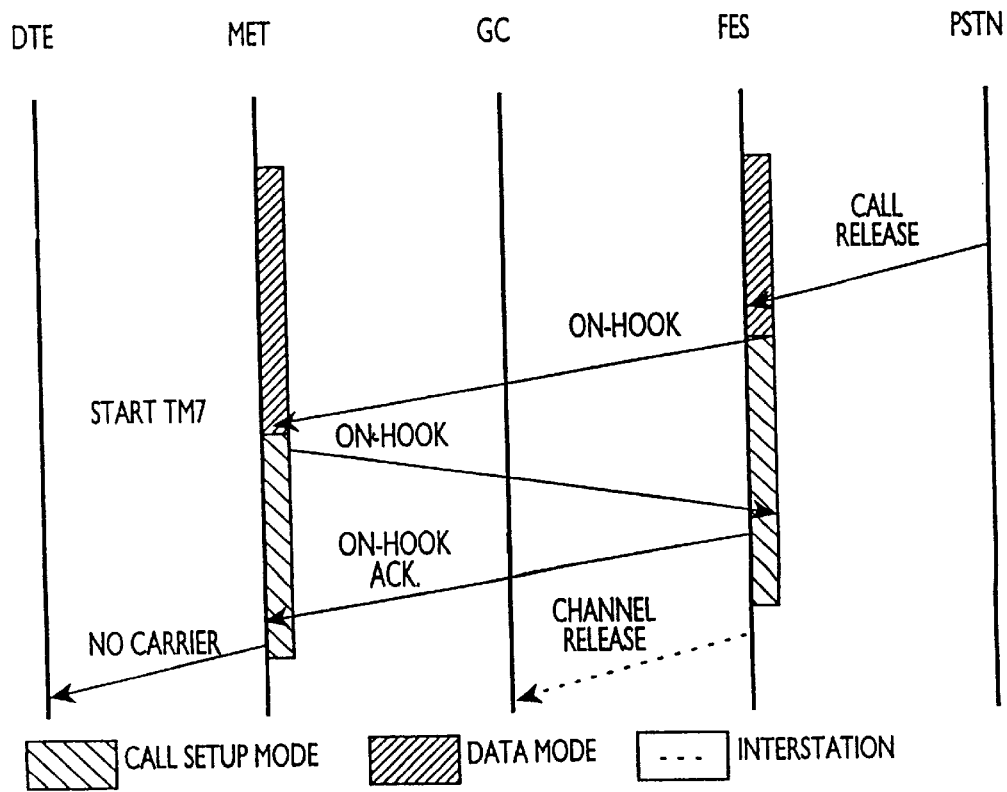
FIG. 24 is a diagram of a call release sequence initiated by the PSTN.

For data calls the DTE must be involved in the call release procedure. The call release procedures for both MET and PSTN initiated data call release is the same as those specified for MET initiated calls. MET originated call release occurs when the DTE issues an ATH command to the MET. When PSTN initiated call release occurs the MET issues a NO CARRIER indication to the DTE. The sequences for MET and PSTN initiated data call release are shown in FIGS. 23–24. The MET continuously transmits "On Hook" SUs until it receives an "On-Hook Acknowledgment" SU or until timers TM5 or TM7 expire.

The data field portion of the data call is used to transport asynchronous data characters. Each data character byte shall consist of either a 7-bit data character representation with a parity bit or an 8-bit character representation. All data characters are transmitted least significant bit first. If a 7-bit data character representation with a parity bits used, the least significant bit shall contain the parity bit. If a 7-bit data character representation without parity bits used, the least significant bit contains a 0 bit. Valid data characters are transported in the first L data character bytes of the frame, where L is the value of the length parameter contained in the length indicator bytes. All other data character bytes preferably contain a 10101010 pattern.

Figure 25:
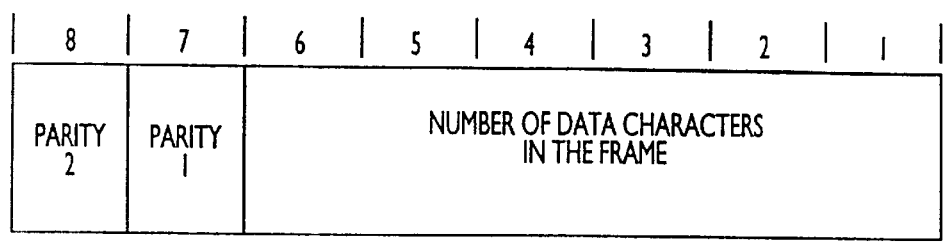
FIG. 25 is a diagram of a data field format.

The format of the length indicator bytes shall be as shown in FIG. 25. The length indicator bytes each contain a 6 bit length parameter that indicates the number of valid data character in the total frame. In addition the length indicator byte contains 2 parity bits used for error detection. The order of transmission of the bits in the length indicator byte is as indicated in FIG. 25.

For PSTN-originated data calls, channel assignment is as specified for PSTN originated voice calls. The GC will determine that the call is a data call and will indicate this in the call type field of the call announcement and MET channel assignment.

Upon reception of the MET channel assignment SU the MET transmits a scrambling vector SU to the FES via the MET-C channel. This message is continuously repeated until a response is received from the FES. If no response is received after 5 seconds the MET ceases transmission and signal call failure to the user. Upon successful reception of the scrambling vector SUs, the FES will compare the access security check fields received from the GC and the MET and will initiate call release if the fields are not identical. If the access security check fields are identical, the FES will begin transmitting the ring command SU to the MET. Upon reception of the ring command SU from the FES, the MET signals the MET user either by generating an audible ringing sound or by sending a RING response to the DTE, sets Tm8 to 12 seconds and also transmits the ring command acknowledgment SU until the ATA command is issued by the MET DTE, or upon expiration of timer Tm8. Upon receiving the ring command acknowledgment from the MET, the FES will transmit a call setup complete SU to the GC to notify it that the channel has successfully been established, and will begin transmitting null signal units to the MET. If timer TM8 expires, the MET initiates a call release.

When the MET DTE issues the ATA command the MET switches to the data frame mode, stop Tm8, and set timer Tm9 to 20 seconds. Upon detection of the MET switching to data frame mode, the FES will switch to data frame mode and will signal off-hook to the PSTN. The FES will then complete the modem bit rate selection and handshake procedures with the PSTN user modem based on CCITT Recommendation V.22bis. Upon completion of the modem bit rate selection and handshake procedures, the FES will begin continuously transmitting a connect SU to the MET. The FES continues sending the connect SU until a connect acknowledge SU is received from the MET. Upon receiving the connect acknowledge SU, the FES ceasestransmitting connect SUs.

Upon receiving the connect SU from the FES, the MET stops timer Tm9 and sends the connect acknowledge SU to the FES. The MET ceases transmitting connect acknowledgement SUs within 2 seconds of the time at which receipt of connect SUs ceases. If timer Tm9 expires, the MET initiates a call release.

MET Facsimile Call

Figure 28:
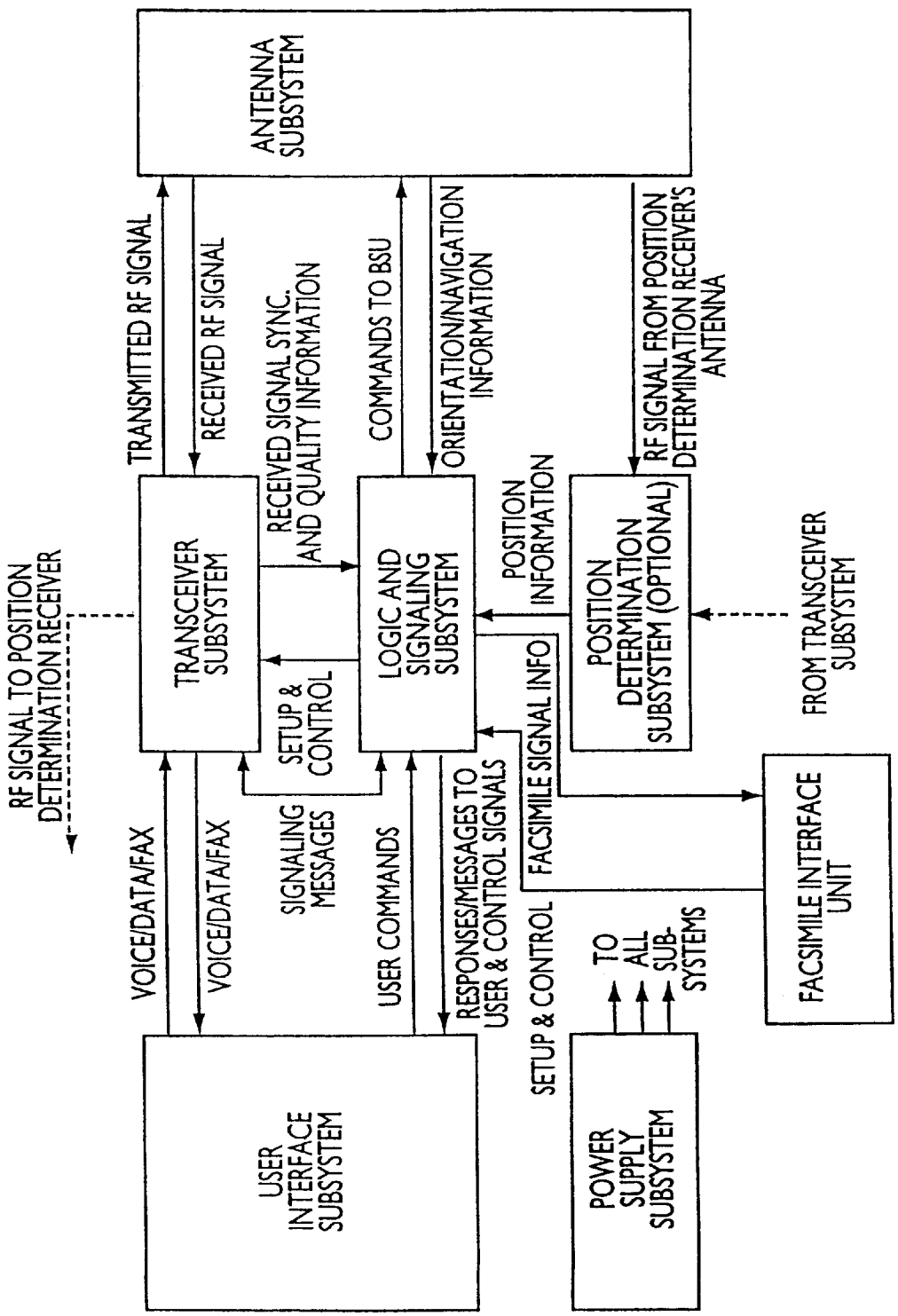
FIG. 28 is a basic block diagram of the functions of the mobile earth terminal including the facsimile interface unit functions.

FIG. 28 is a basic block diagram of the functions of the mobile earth terminal including the facsimile interface unit functions. Facsimile interface units (FIU) are installed in the Feeder Link Earth Stations (FES) and in the MET which communicate with each other by a digital communications channel established in the facsimile data mode. These units enable a terrestrial user's CCITT Group 3 facsimile terminal equipment (FTE) to be interconnected with a MET user's CCITT Group 3 FTE (or between two MET users) via the digital satellite system.

The FIUs perform two basic functions. First, they demodulate the facsimile voiceband signals in the FTE-to-satellite direction (and remodulate the baseband digital signals in the satellite-to-FTE direction). Second, they perform protocol conversions so that the facsimile protocols become compatible with the transport channel constrains of the basic service configuration. To perform these functions, the FIUs consist of several standard elements including Telephone Tone Generators and Detectors; a CCITT V.21 Modulator and Demodulator; and Control Logic for baseband message formatting, facsimile process control, facsimile protocol conversation, call establishment, call control, and call clearing.

The physical interface is preferably characterized using an RJ-11 connector, a 600 ohms signal impedance, a Line Supervision (Detection of Off-Hook and On-Hook), a Minus 24 volt, 30 ma nominal DC source for loop (supervisory) current. The interface preferably provides ringing voltage of 86 Vrms and support up to 5 ring loads, or provides a source over the linear range from 64 Vrms at 50 ms down to a minimum of 40 Vrms at 100 ma. The required generated signaling tones are:

Congestion [480+620Hz (0.25 sec's on and 0.25 sec's off)]
Busy [480+620Hz (0.5 sec's on and 0.5 sec's off)]
Ring-back [440+480Hz (1 sec on and 1 sec off)]
Dial [Reference CCITT E.180:350+440Hz (continuous)-10 Dbm0 nominally]

Figure 29:
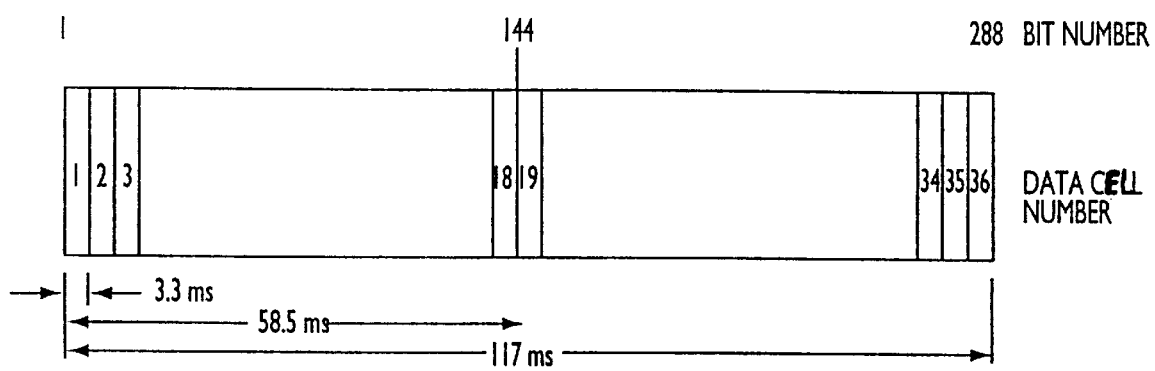
FIG. 29 is a diagram of a data field format at 2400 bit/s as used for facsimile communication.
Figure 26:
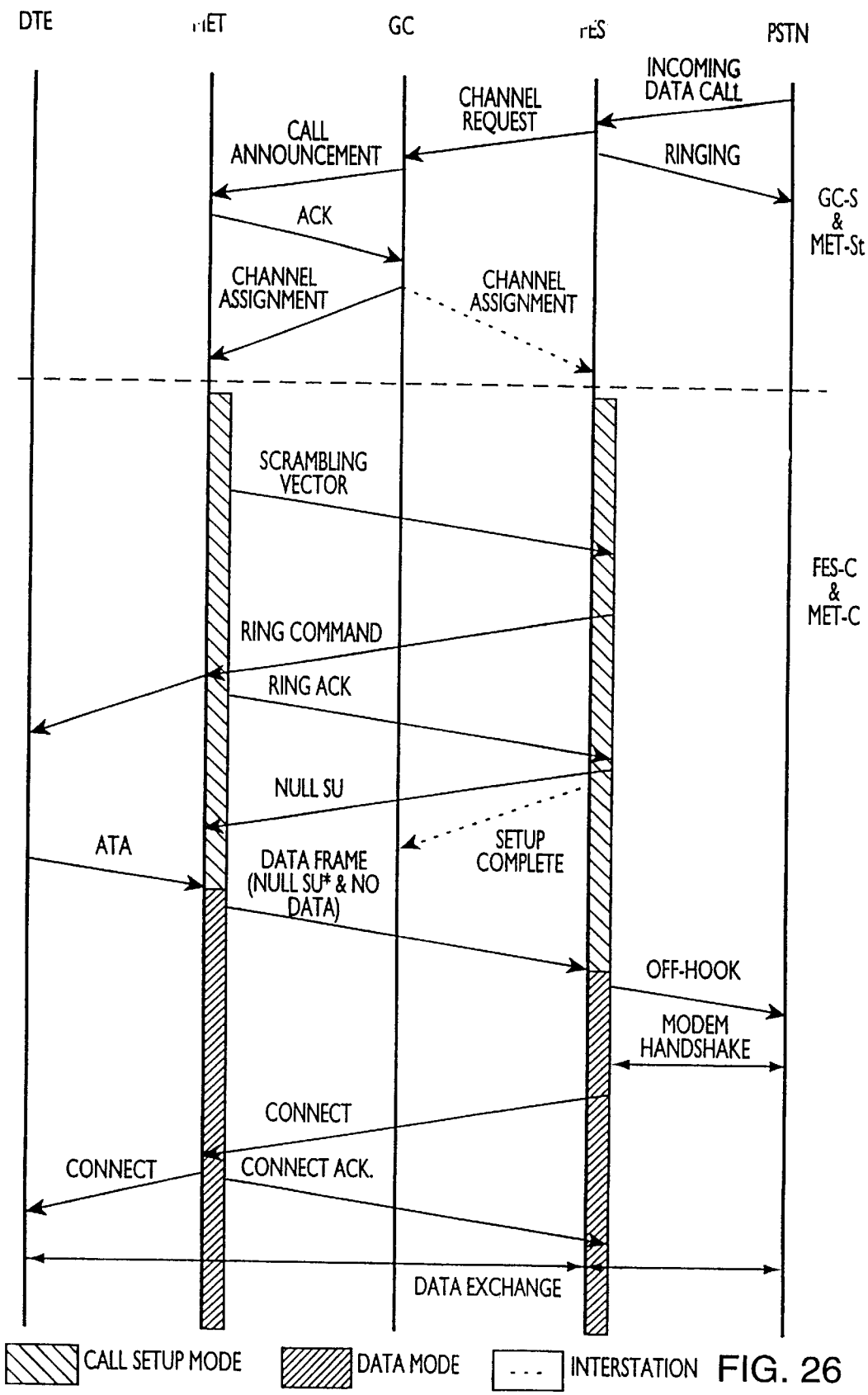
FIG. 26 is a diagram of a call setup sequence between the PSTN and MET.
Figure 27:
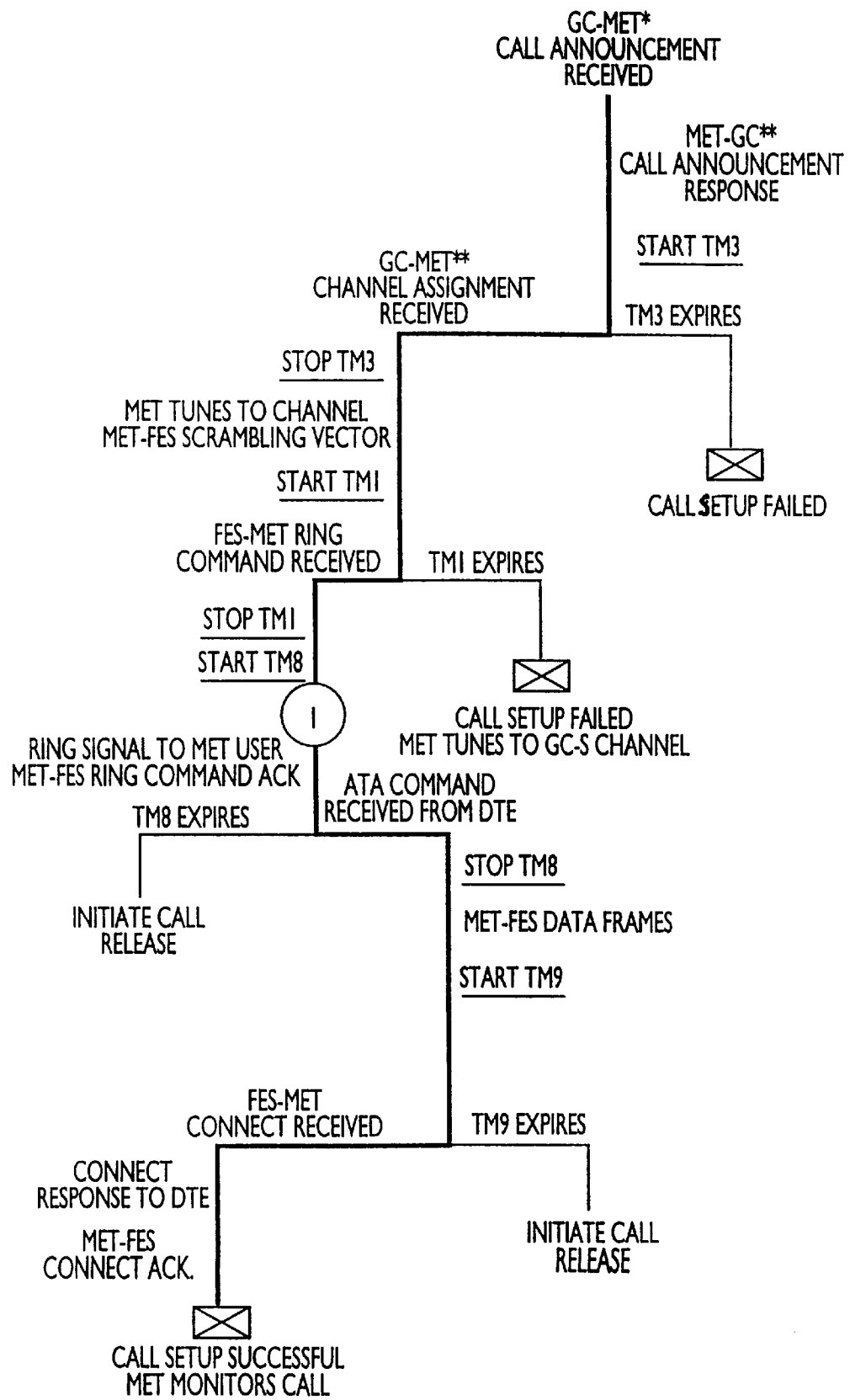
FIG. 27 is an event tree diagram of a call setup sequence between the PSTN and MET.

The FIUs transmit and receive digital signals to an from the satellite 2.4 kbit/ss Data channel in blocks of 288 bits as shown in FIG. 29, which illustrates the sub-field structure of the data channel. In addition, the FIU internally partitions each of the 288-bit data-field into 36, 8-bit data cells. The Digital Facsimile Protocol provides line-state indication by means of the following messages, carried as "line control packets", which are transmitted at full rate (i.e., 2.4 kbit/s) over the data channel. The coding is described below:

| Code | Line state |
|------|------------|
| 0001 | Idle |
| 0010 | CED Connection |
| 0100 | Spare |
| 0111 | Binary Coded Signal Connection |
| 1000 | FIU Capabilities Control Packet |
| 1011 | Synchronizing Signal Connection |
| 1101 | Preamble Connection |
| 1110 | Message Connection |

The coding is associated with the voiceband signal states as shown below:

| Indication | Line State |
|------------|------------|
| Idle | No signal on the telephone circuit |
| CED Connection | 2100 Hz Called Station Identification (CED) signal on the telephone circuit |
| Binary Coded Sig. Connection | 300 bit/s (non-preamble) binary coded procedural signal on the telephone circuit |
| Synch. Signal Connection | Modem synchronizing (or training signal on telephone circuit) |
| Preamble Connection | 300 bit/s binary coded preamble signal on the telephone circuit |
| Message Connection | Facsimile message on the telephone circuit |

The special line state "FIU Capabilities Control Packet" is not associated with an analog line state but with in-band signaling between FIUs.

Line control packets are generated whenever a line state transition occurs, and generally always precede the transmission of information (associated with the new line state) over the digital channel. The indication in the line control packet applies to all associated 8-bit data cells of the satellite channel that immediately follow it until a new line control packet is generated. Hence, these line control packets are used a headers of new information. All non-preamble signals of the 300 bit/s binary coded procedural signalling, which are specified in CCITT Recommendation T.30, are transferred to the re-modulating (distant) FIU in the form of a demodulated baseband digital data stream. A re-modulating (or modulating) FIU is defined as the FIU which is receiving data from the satellite channel for modulation and transmission to the customer FTE. A demodulating FIU is defined as the FIU which is receiving data from the customer FTE for demodulation and transmission to the satellite channel. During a call, an FIU will perform both modulating and demodulating functions, as the signal direction between the end-customer FTEs will change several times.

The facsimile message signal (including the TCF signal) is also transferred to the re-modulating FIU in the form of a demodulated digital data stream. Reception of the modem synchronizing signal on the telephone circuit is indicated by the demodulating FIU to the re-modulating FTU by transmitting the "Synchronizing Signal Connection" line control packet. The FIU at the modulating end generates a modem synchronizing signal according to this indication. Detection of the CED signal on the telephone circuit is indicated by the demodulating FIU to the re-modulating FIU by transmitting the "CED Connection" line control packet. (The actual CED signal cannot be transferred to the re-modulating FIU since it is not digital by nature.)

The tonal signalling procedures defined in CCITT Recommendation T.30 are not generally accommodated by the Digital Facsimile Protocol. The Group 3 procedures recommended by CCITT are generally supported by the FIU. Therefore, the FIU is not required to detect the use of tonal signalling procedures. Eventually a Group 1 or Group 2 FTE should clear the call on the analog circuit when it does not receive proper responses from the FIU.

Line control packets are generated whenever a line state transition occurs, and generally always precede the transmission of information (associated with the new line state) over the digital channel. Because these packets are transmitted in-band over the 2.4 kbit/s data channel, they are generated by the demodulating FIU in the FTE-to-satellite direction and removed by the remodulating FIU in the satellite-to-FTE direction. The first bit of the line control packet must be coincident with a data cell boundary. When generating line control packets these are constructed by utilization of 18 data calls as follows:

The first 9 data calls (72 bits) are comprised of nine repetitions of the "11111111" binary octet and are used as a line control preamble to indicated that the following 9 data cells contain line state transition information. The next 8 data cells (64 bits) are comprised of 16 repetitions of the appropriate 4-bit code for the new line state. The final data cell (8 bits) comprises the unique binary word "11000011" which is used to precisely align the user data associated with the new line state. The new line state indicated by a received line control packet does not become effective until the last bit of the line control packet has been received on the satellite channel. Consequently, since line control packets are 18 data cells long, a line control packet inserted into the satellite data stream effectively adds 60 ms to the length of the previous line state.

This is true for receipt of all line control packets except an "Idle" packet when it has been preceded by either a "Binary Coded Signal Connection" packet or a "Message Connection" packet. In either of those two cases, the "Idle" line control packet must be immediately processed (removed from the satellite data stream) when the first, rather than the last bit of the packet is received, thus avoiding a situation where 60 ms of invalid data would be modulated at either the V.21 or V.27ter mode. To accomplish this "early line control packet detection," the FIU must incorporate a look-ahead buffer between the satellite channel and the FIU software in which it can look ahead 60 ms into the received satellite data stream and identify a valid "Idle" line control packet while in the "Binary Coded Signal Connection" or "Message Connection" line state.

Since, in the special situations, the "Idle" line control packet is removed all at once (instead of removing it over the course of 18 data cell times), the look-ahead buffer will shrink in size as "Idle" line control packets are detected and removed. When the FIU switches from its "modulating" role to its "demodulating" role, the look-ahead buffer may be empty due to the removal of "Idle" line control packets. The buffer must already be filled with satellite data by the time an FIU switches from the "demodulating" role to the "modulating" role. This filling can take place when the FIU is likely to be receiving idle fill over the satellite when it is in the "demodulating" role.

Furthermore, the look-ahead buffer must accommodate two line control packets since, at most, there will be two transitions from "Binary Coded Signal Connection" or "Message Connection" line state to "Idle" line state during a single line turnaround of the half-duplex T.30 facsimile protocol. That is, the buffer must be about 288 bits in size. This will add, at most, 120 ms to the overall delay through the FIU.

The facsimile interface unit (FIU) interworks with a user's CCITT Group 3 facsimile terminal equipment (FTE) through a telephone circuits in accordance with CCITT Recommendation T.30, and with the FIU at the distant end through the satellite channel in accordance with the Digital Facsimile Protocol. To accomplish this, the FIU shall comprise the following standard circuit elements:

*CCITT Recommend. V.27 ter [R-27] voice-band data modem;
*CCITT Recommendation V.21 [R-28] voice-band data modem;
*2100 Hz tone generator and detractor;
*1100 Hz interrupted tone generator and detector;
*processor/controller; and
*elastic buffer, multiplexer/demultiplexer, and interface with the satellite channel unit.

After the FIUs have been switched-in by the FES or the MET in a remote-originated mode (FTE at the opposite FIU has originated the call), the FIU generates the CNG signal (a 1100 Hz interrupted tone) and transmits it to the called user. The CNG signal is terminated following the detection of either the CED signal or a 300 bit/s binary coded procedural signal on the incoming telephone circuit in accordance with the procedures defined in CCITT Recommendation V.25 [R-29]. The characteristics of the CNG signal comply with the relevant requirements specified in CCITT Recommendation T.30.

The called FTE may transmit the CED signal following the connection of the telephone circuit at the called end. The called FIU shall detect the onset and termination of the CED signal on the telephone circuit and shall inform the calling FIU of this e vent by inserting the "CED Connection" line control packet in the satellite channel. The CED signal detector response threshold and times shall be in accordance to CCITT Recommendations T.4, T.30, and V.25 [R.29]. The insertion of the "CED Connection" line control packet in the data channel occurs in the first data-cell to be transmitted after the CED detector output has changed from OFF to ON.

The "CED Connection" line state is changed to "Idle" by transmissions of the "Idle" line control packet in the data channel as soon as the ON-to-OFF transition of the CED signal is detected and a data-cell boundary becomes available, but subject to the restriction that a "Idle" signal gap of 75±20 ms must be inserted (i.e. 22±6 data cells) between the CED signal termination and the following signal (DIS) which is encoded according to the V.21 modulation scheme. That is, there must be at least one data cell between the "Idle" line control packet and the subsequent "Preamble Connection" line control packet (since transmission of the "Preamble Connection" packet contributes 60 ms to the length of the "Idle" line state). It is the responsibility of the FIU to be aware of the (possibly different) on-to-off and off-to-on signal detect times for CED and V.21 Preamble and adjust the generated satellite line control packets accordingly so as to insure a 75±20 ms idle time between different signals.

The called FTE transmits the CED signal following the connection of the telephone circuit at the called end. The called FIU detects the onset and termination of the CED signal on the telephone circuit and informs the calling FIU of this event by inserting the "CED Connection" line control packet in the satellite channel. The CED signal detector response threshold and times are in accordance to CCITT Recommendations T.4, T.30, and V.25 [R-29]. The insertion of the "CED Connection" line control packet in the data channel occurs in the first data-cell to be transmitted after the CED detector output has changed from OFF to ON.

The "CED Connection" line state shall be changed to "Idle" by transmission of the "Idle" line control packet in the data channel as soon as the ON-to-OFF transition of the CED signal is detected and a data-cell boundary becomes available, but subject to the restriction that a "Idle" signal gap of 75±20 ms must be inserted (i.e. 22±6 data cells) between the CED signal termination and the following signal (DIS) which is encoded according to the V.21 modulation scheme. That is, there must be at least one data cell between the "Idle" line control packet and the subsequent "Preamble Connection" line control packet (since transmission of the "Preamble Connection" packet contributes 60 ms to the length of the "Idle" line state). The FIU detects the (possibly different) on-to-off and off-to-on signal detect times for CED and V.21 Preamble and adjusts the generated satellite line control packets accordingly so as to insure a 75±20 ms idle time between different signals.

A CED signal is generated by the called FTE after the telephone circuit has been connected between the called FIU and the called FTE. The onset and termination of the CED signal on the telephone circuit are detected by the called (demodulating) FIU and signalled to the calling (re-modulating) FIU by means of line control packets. The calling FIU shall generate a CED signal (2100 Hz tone) and shall transmit it to the calling FTE when the line control packet indicates "CED Connection". The OFF-to-ON instruction to the tone generator shall occur only after the entire "CED Connection" line control packet has been received.

The ON-to-OFF instruction to the tone generator occurs when a new line control packet has been detected by the called FIU. Ideally, the "Idle" line control packet will be received following the "CED Connection" packet, but errors on the satellite channel may corrupt the "Idle" packet so that the "Preamble Connection" packet may be the next one detected. The characteristics of the generated 2100 Hz tone shall comply with the relevant requirements for the CED signal specified in CCITT Recommendations T.30, T.4, and V.25.

The FIU receives and demodulates the binary coded procedural signals which are defined in CCITT Recommendation T.30 and which appear on the incoming telephone circuit. The binary coded procedural signals (except the TCF signal) are modulated at 300 bit/s in accordance with the CCITT Recommendation V.21 modulation system and are preceded by the preamble (sequence of repeated flags) specified in CCITT Recommendation T.30. The TCF signal is modulated at 2.4 kbit/s in accordance with CCITT Recommendation V.27 ter and is preceded by the modem synchronizing signal. The data is transmitted over the satellite channel in the same order as received over the telephone circuit (i.e., the first bit received over the telephone circuit by the demodulating FIU is the first bit to be sent over the satellite channel to the re-modulating FIU).

Figure 30:
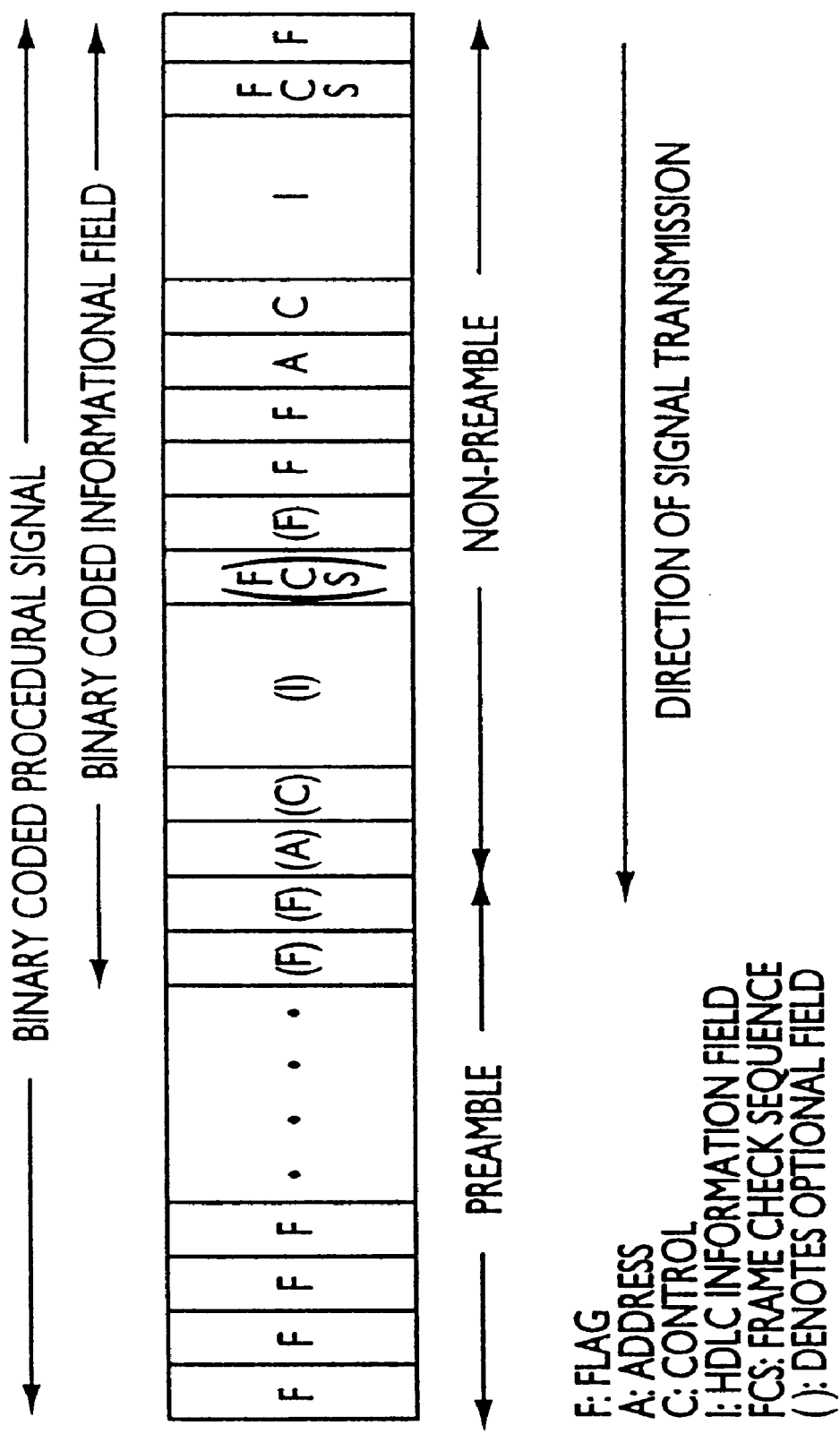
FIG. 30 is a diagram of a binary coded procedural signal.

The non-preamble portion of the V.21 modulated 300 bit/s binary coded procedural signal is defined as the portion of this signal which begins with the first non-Flag octet and ends with the last Flag received after the last HDLC frame. The preamble portion of the 300 bit/s binary coded procedural signal is defined as the portion of the V.21 modulated signal which begins with the first Flag and ends with the last Flag preceding the non-preamble portion (i.e. ends with the Flag preceding the first non-Flag octet of the binary coded information field). This definition is illustrated in FIG. 30.

The demodulated data stream of the non-preamble portion of the 300 bit/s binary coded procedural signal is transmitted to the re-modulating FIU regardless of the error state of the signal. The binary coded Address, Control, and HDLC information fields of the demodulated data (with the exception of the NEF, DIS, and DTC signals) are not generally manipulated by the demodulation process and the FCS field indicates an error condition, the regenerated FCS sequence must be such that it will result in an error condition being detected by the distant FTE, assuming subsequent error-free transmission. Transmission of the data shall be immediately preceded by the transmission of the "Binary Coded Signal Connection" line control packet.

When the demodulating FIU manipulates the DIS, DTC and DCS signals in the manner described in the preceding paragraphs, a new Frame Checking Sequence (FCS) must be computed. However, if the original (prior to manipulation) signal indicates an FCS error, the sequence computed must be such that it will result in an error condition being detected by the distant FTE assuming subsequent error-free transmission. The demodulated, non-preamble data stream of the 300 bit/s signal is transmitted to the re-modulating FIU over the satellite channel, preceded by the "Binary Coded Sequence Connection" line control packet. The line control packet is delayed by the same amount as that introduced in the preamble in paragraph 10 above and is further aligned to make the first bit of the line control packet coincident with the first bit of a data cell. When reception of the 300 bit/s signal ceases, an "Idle" line control packet shall be inserted in the satellite channel starting at the next available data cell. The response time for the Synchronizing/TCF signal detection is in accordance to CCITT Recommendations T.4, and V.27ter.

The onset of the synchronizing portion of the synchronizing/TCF signal is signalled to the distant FIU by transmitting the "Synchronizing Signal Connection" line control packet. The transmission of the "Synchronizing Signal Connection" line control packet, signifying the transition from the "Idle" to the "Synchronizing Signal Connection" line state, occurs in the first data cell of the satellite data channel after a period of 75±20 ms of idle activity has been transmitted over the satellite channel following the end of the previous (DCS) signal which was originally encoded according to the V.21 modulation scheme. That is, there must be at least one data cell between the "Idle" line control packet and the subsequent "Synchronizing Signal Connection" line control packet (since transmission of the "Synchronizing Signal Connection" packet contributes 60 ms to the length of the "Idle" line state. The FIU detects the (possibly different) on-to-off and off-to-on signal detect times for V.27 ter and V.21 and adjusts the generated satellite line control packets accordingly so as to insure a 75±20 ms idle time between different signals.

When the line control packet indicate "Synchronizing Signal Connection", the data stream sent to the distant FIU includes a binary all "zero" sequence irrespective of the demodulated sequence. The "Synchronizing Signal Connection" line state continues until local V.27ter modem training is complete and the first bit of TCF data is demodulated by the local V.27ter modem. The signal activity detector does not detect Segment 2 of the V.27ter training sequence ("No transmitted energy") as the end of the modem Turn-On sequence. Thus, the Synchronizing Signal Connection line state will apply for at least 225 ms (regardless of the signal activity detector output state).

The demodulated and unscrambled TCF signal (originally a series of binary "zeros") is transmitted to the re-modulating FIU over the satellite channel, preceded by transmitting the "Message Connection" line control packet. To compensate for the possibility that the demodulating V.27ter modem interprets the end of the modem Turn-On sequence as TCF data, the FIU insures that the first 6 data cells (48 bits) of the TCF data transmitted over the satellite consist of binary "zeros", no matter what was actually demodulated by the V.27ter modem. The "Message Connection" line control packet and subsequent TCF data is delayed by the same amount as that introduced to the "Synchronizing Signal Connection" line control packet defined in paragraph 17 above, and is further aligned to make the first bit of the line control packet coincident with the first bit of the data cell.

The end of the TCF signal is determined by the FIU, and the tail of the signal is discarded if the number of bits is insufficient to fill the data cell. An "Idle" line control packet shall then be transmitted to the distant FIU in the following data cell.

The re-modulating FIU receives the data stream for the 300 bit/s binary coded procedural signals or the TCF signals (preceded by the "Binary Coded Signal Connection" or "Message Connection" line control packet, respectively) which are transmitted over the satellite by the demodulating FIU. The re-modulating FIU generates the voice-band data signals for the non-preamble portions of the binary coded procedural signals based on the data stream and the relevant line control packet, and transmits them to the FTE on the outgoing telephone circuit. In generating the modulated signals, no manipulation of the data is performed by the re-modulating FIU. If a new Frame Checking Sequence (FCS) is regenerated, and the original signal indicates an FCS error, the sequence computed must be such that it will result in an error condition being detected by the FTE, assuming subsequent error-free transmission.

The modulation applied to the data which have been preceded by the "Binary Coded Signal Connection" line control packet are at 300 bit/s and in accordance with the CCITT Recommendation V.21 modulation system (as specified in CCITT Recommendation T.30). The entire data, after removal of the line control packet, are transmitted to the FTE. The transmission of the 300 bit/s modulated binary coded signal preamble commences immediately after reception of a valid "Preamble Connection" line control packet and continues for as long as no new line state transition in the form of a valid line control packet is received. The Demodulating FIU makes sure that there is at least a 75±20 ms gap between the "Preamble Connection" line state and the preceding line state. The re-modulating FIU must insure that the length of the "Idle" line state indicated on the satellite is correctly reproduced on the analog circuit. If, due to channel errors, the "Preamble Connection" line control packet was not preceded by an "Idle" packet, then the re-modulating FIU must insure that there is 75±20 ms of idle analog line state before the flag sequence begins.

The transmission of the non-preamble 300 bit/s modulated binary coded (non-preamble procedural signals is initiated following the recognition of a line state change from "Preamble Connection" to "Binary Coded Signal Connection" signalled by the reception of a valid "Binary Coded Signal Connection" line control packet from the satellite data channel. The transmission of the non-preamble portion of the 300 bit/s modulated binary coded procedural signals follow the termination of the preamble with no interruption of signal energy on the outgoing telephone circuit. Furthermore, in order to preserve the octet integrity of the preamble being transmitted the 300 bit/s modulated binary coded procedural signals may additionally be delayed by a period of up to 8 data cells.

The transmission of the non-preamble 300 bit/s modulated signals continues until a valid "Idle" line control packet is received from the satellite channel. The FIU "looks ahead" in the received satellite data stream to identify the "Idle" line control packet as soon as its first bit has been received. The "Idle" line control packet, once so identified, will be immediately removed from the satellite data stream and will not contribute an additional 60 ms of time to the existing "Binary Coded Signal Connection" analog line state. In generating the TCF signal, the modulation shall be in accordance with CCITT Recommendation V.27ter.

When the most recently received line control packet indicates "Synchronizing Signal Connection", a modem synchronizing signal (the long sequence with protection against talker echo as specified in CCITT Recommendation V.27 ter) shall be generated by the re-modulating FIU. Transmission of the modem synchronizing signal is initiated only after the line state change from "Idle" to "Synchronizing Signal Connection" has been detected by the reception of a valid "Synchronizing Signal Connection" line control packet. If the Synchronizing Signal has been preceded by a signal encoded according to the V.21 modulation scheme in the same direction of transmission(i.e. DCS), the demodulating FIU has made sure that the duration of the "Idle" line state between the last flag of the "DCS" message and the start of the "Synchronizing Signal Connection" line state is at least 75±20 ms. The re-modulating FIU must insure that the duration of this "Idle" line state is accurately reproduced on the analog circuit. If, due to channel errors, the "Synchronizing Signal Connection" line control packet was not preceded by an "Idle" packet, then the re-modulating FIU insures that there is 75±20 ms of idle analog line state before the flag sequence begins.

The synchronizing signal is followed, without an interruption of signal energy, by a signal modulated by the received TCF data (after removal of the "Message Connection" line control packet which will take an additional 60 ms). The received data is delayed as appropriate, to allow the first effective bit of data preceded by the "Message Connection" indication to coincide with the first bit which follows the synchronizing signal in the modulated signal. Ideally, the FIU will insure that data consisting of binary "zeros" is modulated in the event that v.27ter modem training completes before the "Message Connection" line control packet is received over the satellite. This situation could occur because of the tolerance allowed in V.27ter for the modem Turn-On sequence. Once the "Message Connection" line control packet is received, TCF data is modulated without modification by the FIU.

The TCF signal is almost immediately terminated upon reception of a valid "Idle" line control packet from the satellite channel. The FIU "looks ahead" in the received satellite data stream to identify the "Idle" line control packet as soon as its first bit has been received. The "Idle" line control packet, once so identified, will be almost immediately removed from the satellite data stream and will not contribute an additional 60 ms of time to the existing "Message Connection" analog line state.

The demodulating FIU receives and demodulates facsimile message signals modulated at 2400 bit/s using the CCITT Recommendation V.27 ter modulation system, as defined in CCITT Recommendation T.4. Each transmission of a message is preceded by the modem synchronizing signal specified in the CCITT V.27 ter. The onset of the synchronizing signal portion of the synchronizing facsimile message signal on the incoming telephone circuit is detected by the demodulating FIU and signalled to the re-modulating FIU by transmitting the "Synchronizing Signal Connection" line control packet over the satellite data channel in the first available data cell.

When CCITT V.27ter modem training has completed, the demodulating FIU inserts a "Message Connection" line control packet in the satellite data stream as soon as the first bit of valid demodulated data is available. Transmission of the demodulated data over the satellite is preferably in the same bit order as it was received on the analog circuit. The demodulated facsimile message is not generally manipulated in any way by the demodulating FIU. The tail of the facsimile message signal is detected by the demodulating FIU. The "Idle" line control packet is then transmitted to the re-modulating FIU. The "Idle" line control packet is transmitted to the re-modulating FIU in the data cell following the last bit of the last HDLC frame containing the last bit message data. If insufficient data is demodulated to fill a complete satellite data cell, it will be padded with binary "zeroes" in order reach a data cell boundary.

The re-modulating FIU receives the facsimile message data stream which is transmitted over the satellite channel by the demodulating FIU, preceded by a "Message Connection" line control packet. When the most recently received line control packet indicates "Synchronizing Signal Connection" the long modem synchronizing sequence with protection against talker echo specified in CCITT Recommendation V.27ter is generated by the re-modulating FIU. The re-modulating FIU generates a voice-band data signal for the facsimile message signal, based on the received data stream, and transmits it to the FTE using 2.5 kbit/s modulation in accordance with CCITT Recommendation V.27ter.

The synchronizing signal is followed, without an interruption of signal energy, by a signal modulated by the received data, which is introduced by the "Message Connection" line control packet. Modulation of this data may be delayed to allow the first bit of data to coincide with the first bit which follows the modem synchronizing signal. It may also happen that local modem V.27ter training takes less time than that experienced at the demodulating FIU, as indicated by the local V.27ter modem completing its synchronizing phase before the arrival of the "Message Connection" line control packet. In this case, the FIU insures that binary data consisting of all "ones" should be inserted in the modulated data stream as fill until the arrival of the "Message Connection" line control packet. Then, insertion of fill will cease and the relevant data cells received over the satellite will be modulated on the analog circuit starting with the next available bit position in the modulated data stream.

The Message signal is almost immediately terminated on completion of the last bit of data as indicated by receipt of the "Idle" line control packet. The FIU "looks ahead" in the received satellite data stream to identify the "Idle" line control packet as soon as its first bit has been received. The "Idle" line control packet, once so identified, will be immediately removed from the satellite data stream and will not contribute an additional 60 ms of time to the existing "Message Connection" analog line state.

The FIUs, in the course of performing the processing tasks (e.g. signal detection, elastic buffering, signal buffering, line control packet generation and "look ahead") may introduce additional delays along the signal path from one FTE to another. The total throughout delay introduced by each FIU is implementation dependent but must not be greater than 1 second end-to-end. That is, the sum of the delay through the originating FIU plus the delay through the destination FIU must not exceed this value in either direction of data flow. This figure includes delays associated with the modulator and demodulator, the FIU itself and the FIU-to-modem interface. It does not include satellite transmission delay or delay through the PSTN network.

Delays due to satellite transmission and PSTN transmission should not exceed 0.5 seconds. This may require the selection of low-delay PSTN connections at the FES. The total delay, therefore, between FTEs should not exceed 1.5 seconds in either direction of data flow.

When the FES detects that a facsimile call is in progress, it will "switch-in" the FES FIU and signal to it whether this is a fixed or mobile-originated call. When the FES FIU has been switched-in with a fixed-originated call, it may receive a CNG tone from the FTE but this is ignored. It may also eventually receive a V.21 message from the FTE containing a DCN frame in the event that the FTE times out while waiting for a message from the MET FTE. Primarily, the FES FIU will be awaiting a signal from the MET FTU. When the FES FIU has been switched-in with a mobile-originated call, it will start generating CNG tone on the analog circuit to the FTE. It will also be prepared to detect either CED tone or the onset of V.21 preamble. In either case, it will cease generation of the CNG tone as soon as either of these two signals has been detected.

The FES will "switch-out" the FES FIU when it detects that the satellite or PSTN call has cleared. The FIU will immediately cease operations both on the satellite and analog connections. Since there maybe significant buffering of satellite or analog data both inside and outside the FIU, the FES will delay implementing the switch-out operation until it is certain that all buffered data has been delivered to the appropriate channel (and thus to either the MET or the analog FTE).

When the MET detects that a facsimile call is in progress, it will "switch-in" the MET FIU and signal to it whether this is a fixed or mobile-originated call. When the MET FIU has been switched-in with a mobile-originated call, it may receive a CNG tone from the FTE but this is ignored. It may also eventually receive a V.212 message from the FTE containing a DCN frame in the event that the FTE times out while waiting for a message from the FES FTE. Primarily the MET FIU will be awaiting a signal from the FES FIU. When the MET FIU has been switched-in with a fixed-originated call, it will start generating CNG tone on the analog circuit to the FTE. It will also be prepared to detect either CED tone or the onset of V.21 preamble. In either case, it will cease generation of the CNG tone as soon as either of these two signals has been detected.

Although a number of arrangements of the invention have been mentioned by way of example, it is not intended that the invention be limited thereto. Accordingly, the invention should be considered to include any and all configuration, modifications, variations, combinations or equivalent arrangements falling within the scope of the following claims.

What is claimed is:

1. In a mobile satellite system, a mobile communication system comprising:

a user interface system providing a user interface through which a user has access to services supported by the mobile satellite system;

an interface system providing an interface between the mobile communication system and the mobile satellite system, receiving a first satellite message from the mobile satellite system and converting the first satellite message into at least one of voice, data, fax and signaling signals for transmitting to the user interface system;

a logic and signaling system, operatively connected to said interface system, configuring said interface system for reception and transmission of the at least one of voice, data, fax and signaling messages, said logic and signaling system providing a communication function permitting the mobile communication system to alternately communicate between the mobile satellite system and a terrestrial based communication system responsive to predetermined selection of a primary service and an alternate service, wherein upon the loss of the primary service, the mobile communication system attempts to communicate with the alternate service in accordance with predetermined criteria; and a digital terminal equipment unit. operatively connected to said logic and signaling system, initiating a call release for said mobile communication system by issuing a release command to said logic signaling system. and when the call release is initiated by a public switched telephone network, said logic and signaling system issues a no carrier indication to said digital terminal equipment, and continuously transmits an on hook status until at least one of receiving an on-hook acknowledgment and expiration of a predetermined time interval.

2. The mobile communication system according to claim 1, wherein the predetermined criteria are at least one of user definable and system definable.

3. In a mobile satellite system, a method of providing alternate communication between the mobile satellite system and a terrestrial based communication system using a mobile communication system responsive to selection of a primary service and an alternate service, said method comprising the steps of:

(a) determining whether the mobile communication system is communicable with the primary service;

(b) when the mobile communication system, is not communicable with the primary service, attempting by the mobile communication system to communicate with the alternate service; and (c) when the mobile communication system is not communicable with either of the primary and alternate services, monitoring the primary and alternate services, and attempting to communicate on one of the primary and alternate services that is satisfactorily available; and (d) initiating a call release for said mobile communication system by issuing a release command, and when the call release is initiated by a public switched telephone network, issuing a no carrier indication, and continuously transmitting an on hook status until at least one of receiving an on-hook acknowledgment and expiration of a predetermined time interval.

4. The method according to claim 3, wherein the selection of the primary and alternate services is at least one of user definable and system definable.

5. In a mobile satellite system, a mobile communication system comprising:

a user interface system providing a user interface through which a user has access to services supported by the mobile satellite system;

an interface system providing an interface between the mobile communication system and the mobile satellite system;

a logic and signaling system, operatively connected to said interface, using an outbound signaling channel and configuring said interface system for reception and transmission of at least one of voice, data, fax and signaling messages, said logic and signaling system providing a roam function permitting the mobile communication system to roam between the mobile satellite system and a terrestrial based communication system responsive to predetermined selection of a primary service and an alternate service, wherein upon the loss of the primary service the mobile communication system attempts to register in the alternate service in accordance with predetermined criteria; and a digital terminal equipment unit. operatively connected to said logic and signaling system, initiating a call release for said mobile communication system by issuing a release command to said logic signaling system, and when the call release is initiated by a public switched telephone network, said logic and signaling system issues a no carrier indication to said digital terminal equipment, and continuously transmits an on hook status until at least one of receiving an on-hook acknowledgment and expiration of a predetermined time interval.

6. A mobile communication system according to claim 5, further comprising a facsimile interface unit, operatively connected to said logic and signaling system, said facsimile interface unit generating a line control packet responsive to a line state transition indicating transmission of information associated with a new line state over a communication channel.

7. In a mobile satellite system, a mobile communication system comprising:

a user interface system providing a user interface through which a user has access to services supported by the mobile satellite system;

an antenna system providing an interface between the mobile communication system and the mobile satellite system via the satellite interface system, and receiving a first satellite message from the satellite and transmitting a second satellite message to the satellite, a transceiver system, operatively connected to said antenna system, including a receiver and a transmitter, the transmitter converting the second satellite message including at least one of voice, data, fax and signaling signals into a modulated signal, transmitting the modulated signal to said antenna system, the receiver accepting the first satellite message from the antenna system and converting the first satellite message into at least one of voice, data, fax and signaling signals, at least one of the voice, data and fax signals routed to the user interface system;

a logic and signaling system, operatively connected to said transceiver, controlling initialization of the mobile communication system, obtaining an assigned outbound signaling channel from which updated system information and commands and messages are received, said logic and signaling system configuring said transceiver for reception and transmission of at least one of voice, data, fax and signaling messages, and controlling protocols between the mobile communication system and the mobile satellite system, said logic and signaling system providing a communication function permitting the mobile communication system to at least alternately communicate between the mobile satellite system and a terrestrial based communication system responsive to the user selection of a primary service and an alternate service, wherein upon the loss of the primary service the mobile communication system attempts to communicate with the alternate service; and an optional digital terminal equipment unit, operatively connected to said logic and signaling system, said optional digital terminal equipment unit initiating a call release for said mobile communication system by issuing a release command to said logic signaling system, and when the call release is initiated by a public switched telephone network, said logic and signaling system issues a no carrier indication to said optional digital terminal equipment, and continuously transmits an on hook status until at least one of receiving an on-hook acknowledgment and expiration of a predetermined time interval.

8. In a mobile satellite system, a mobile communication system comprising:

a user interface system providing a user interface through which a user has access to services supported by the mobile satellite system;

an antenna system providing an interface between the mobile communication system and the mobile satellite system via the satellite interface system, and receiving a first satellite message from the satellite and transmitting a second satellite message to the satellite, a transceiver system, operatively connected to said antenna system, including a receiver and a transmitter, the transmitter converting the second satellite message including at least one of voice, data, fax and signaling signals into a modulated signal, transmitting the modulated signal to said antenna system, the receiver accepting the first satellite message from the antenna system and converting the first satellite message into at least one of voice, data, fax and signaling signals, at least one of the voice, data and fax signals routed to the user interface system;

a logic and signaling system, operatively connected to said transceiver, controlling initialization of the mobile communication system, obtaining an assigned outbound signaling channel from which updated system information and commands and messages are received, said logic and signaling system configuring said transceiver for reception and transmission of at least one of voice, data, fax and signaling messages, and controlling protocols between the mobile communication system and the mobile satellite system, said logic and signaling system providing a communication function permitting the mobile communication system to at least alternately communicate between the mobile satellite system and a terrestrial based communication system responsive to the user selection of a primary service and an alternate service, wherein upon the loss of the primary service the mobile communication system attempts to communicate with the alternate service;

an optional digital terminal equipment unit, operatively connected to said logic and signaling system, said optional digital terminal equipment unit initiating a call release for said mobile communication system by issuing a release command to said logic signaling system, and when the call release is initiated by a public switched telephone network, said logic and signaling system issues a no carrier indication to said optional digital terminal equipment, and continuously transmits an on hook status until at least one of receiving an on-hook acknowledgment and expiration of a predetermined time interval; and an optional facsimile interface unit operatively connected to said logic and signaling system, generating a line control packet responsive to a line state transition indicating transmission of information associated with a new line state over a communication channel, said optional facsimile interface unit comprising a look ahead buffer to perform line control packet detection by looking ahead a predetermined time interval into a received data stream and identifying a valid idle line control packet.

\* \* \* \* \*

UNITED STATES PATENT AND TRADEMARK OFFICE
CERTIFICATE OF CORRECTION

PATENT NO.   : 6,278,861 B1
DATED        : August 21, 2001
INVENTOR(S)  : Ward et al.

Page 1 of 1

It is certified that error appears in the above-identified patent and that said Letters Patent is hereby corrected as shown below:

<u>Title page,</u>
Item [56], OTHER PUBLICATIONS, please insert:
-- "MSAT and Cellular Hybrid Networking", P.W. Baranowsky II, Westinghouse Electric Corporation. --

Item [60], Related U.S. Application Data,
please change "60/008,374" to -- 60/002,374 --

Signed and Sealed this

Twenty-sixth Day of February, 2002

*Attest:*

*Attesting Officer*

JAMES E. ROGAN
*Director of the United States Patent and Trademark Office*